United States Patent [19]

Hallidy

[11] Patent Number: 5,418,446
[45] Date of Patent: May 23, 1995

[54] VARIABLE SPEED CONSTANT FREQUENCY SYNCHRONOUS ELECTRIC POWER GENERATING SYSTEM AND METHOD OF USING SAME

[76] Inventor: William M. Hallidy, 620 E. Laurel, Glendora, Calif. 91740

[21] Appl. No.: 59,832

[22] Filed: May 10, 1993

[51] Int. Cl.⁶ .............................................. H02P 9/42
[52] U.S. Cl. .......................................... 322/28; 322/32
[58] Field of Search ..................... 322/14, 17, 28, 29, 322/30, 31, 32, 51, 59, 61

[56] References Cited

U.S. PATENT DOCUMENTS

| | | | |
|---|---|---|---|
| 2,590,120 | 3/1952 | Pestarini | 318/140 |
| 2,659,044 | 11/1953 | MacNeil | 322/24 |
| 2,829,333 | 4/1958 | Turvey | 322/32 |
| 2,885,625 | 5/1959 | Pittman, Jr. | 322/32 |
| 3,070,740 | 12/1962 | Chirgwin et al. | 322/32 |
| 3,070,741 | 12/1962 | Ford | 322/61 |
| 3,084,324 | 4/1963 | Sampietro et al. | 322/32 |
| 3,177,387 | 4/1965 | Leischner | 310/160 |
| 3,233,164 | 2/1966 | Tyler | 322/28 |
| 3,378,756 | 4/1968 | Potter | 322/32 |
| 3,476,999 | 11/1969 | Agarwal | 318/146 |
| 3,786,336 | 1/1974 | Lohr | 322/32 X |
| 4,229,689 | 10/1980 | Nickoladze | 322/32 |
| 4,246,531 | 1/1981 | Jordan | 322/28 |
| 4,378,587 | 3/1983 | McClain et al. | 322/29 X |
| 4,387,335 | 6/1983 | Fisher et al. | 322/32 |
| 4,510,433 | 4/1985 | Gamze et al. | 322/32 |
| 4,701,691 | 10/1987 | Nikoladze | 322/32 |

*Primary Examiner*—Kristine L. Peckman
*Attorney, Agent, or Firm*—Bernard L. Kleinke; Jerry R. Potts

[57] ABSTRACT

A variable speed constant frequency synchronous electrical generating system includes a generator rotor with a polyphase field winding whereby the position of the electromagnetic field relative to the rotor structure can be controllably varied. The system includes means to substantially instantaneously determine the angular or rotational position of the generator rotor relative to a reference member rotating at a reference speed; whereby the angular position of the generator electromagnetic field relative to the structure of the generator rotor is maintained essentially the same as the angular position of the reference member, rotating at a reference speed, relative to the generator rotor. As a consequence, the rotational speed of the generator electromagnetic field is essentially the same as the reference rotational speed of the reference member, and is substantially independent of the rotational speed of the generator power input shaft. The system includes means to electronically synthesize a reference rotational speed.

26 Claims, 13 Drawing Sheets

VARIABLE SPEED CONSTANT FREQUENCY SYNCHRONOUS ELECTRIC POWER GENERATING SYSTEM AND METHOD OF USING SAME

TECHNICAL FIELD

This invention relates to alternating current (AC) synchronous electric power generating systems, and methods of using such generating systems. More particularly, the invention relates to an improved arrangement whereby the AC frequency of the generated electrical output of a synchronous generator is not directly dependent on the rotational speed of the power input shaft and of the mechanical structure (rotor) containing the electromagnetic field of the generator.

BACKGROUND ART

The bulk of the electric loads in the modern industrial world requires a precisely regulated AC frequency. The AC electric power in the world is usually generated by synchronous generators with rotating electromagnetic fields.

The AC frequency of the generated output from a synchronous generator is defined generally by the relationship $F=(P \times N)/120$ where:

$F$ = AC frequency of generated output [cycles per second, or Hertz (HZ)];
$P$ = number of magnetic poles; and
$N$ = rotational velocity of magnetic field with respect to the stator armature windings (RPM).

In conventional modern synchronous generators, the magnetic field of the generator is fixed in position relative to the rotor of the generator. Thus, the frequency of the generated alternating current produced by the generator is determined by the rotational velocity of the power input shaft and the rotor of the generator.

A great deal of effort has been expended by the electrical power generating industry in the attempt to provide generated AC power at essentially constant AC frequencies by attempting to maintain the rotational speed of the rotor of synchronous generators at a precise fixed speed, with only partial success. Even the best rotational speed governors permit undesirable deviations from the ideal synchronous speed, resulting in generated electrical power with undesirably varying AC frequency.

Many attempts have been made to provide techniques to enable the AC frequency of the generated output from a synchronous generator to be independent of, or at least less dependent on, the rotational speed of the rotor of the generator. One approach has been to use complex electronic circuitry connected to the output of the generator. This electronic circuitry processes the full output of the generator to convert the varying or wild frequency AC output from the generator into a precisely fixed frequency AC output from the electronic inverter. While the approach may have been successful for some applications, the prohibitive cost of such an electronic converter restricts its use to only a limited number of critical applications.

Another approach has been to provide a technique for maintaining a constant rotational velocity of the magnetic field with respect to the stator armature windings of the generator, independently of the rotational speed of the power input shaft and rotor of the generator. In the latter approach, the rotor of the generator employs a polyphase AC electric winding similar to the electric winding found in the wound-rotor of a wound-rotor induction motor.

Applying AC power with the proper controllably variable AC frequency to the electric windings in the wound-rotor causes the electromagnetic field to rotate about the axis of the rotor at a controllably variable speed and direction to compensate for the variations in rotational speed of the rotor of the generator. Thus, the rotational velocity of the main electromagnetic field can be maintained essentially constant with respect to the stator armature windings of the generator, and the AC frequency of the generated output remains essentially constant For a more detailed explanation of the latter approach, reference may be made to U.S. Pat. Nos. 2,659,044 and 4,246,531 which teach substantially similar arrangements. U.S. Pat. No. 2,659,044 discloses an apparatus for varying the frequency of the AC applied to the rotor windings in order to maintain the frequency of the generated AC output at somewhat constant value.

However, neither the apparatus in U.S. Pat. No. 2,659,044, nor in U.S. Pat. No. 4,246,531, can function at or near synchronous speed. In this regard, such apparatus can only function successfully when the rotors of both the main power generator and the field excitation power producing generator rotate at a speed substantially different from synchronous speed. Additionally, the apparatus in both patents require two generators to supplement the main power generator, and thus are relatively large and expensive.

U.S. Pat. No. 3,070,470 teaches an apparatus having an electronic cycloconverter mounted on the rotating shaft of the generator. The cycloconverter is electrically interposed between the source of the field excitation power and the wound-rotor electric windings comprising the main electromagnetic field windings of the main power generator.

The cycloconverter of U.S. Pat. No. 3,070,470 is controlled by electronic circuitry in such a manner to change the AC frequency of the output from the exciter generator to some controllably variable AC frequency. This controllably variable AC frequency is applied to the electric windings in the wound-rotor of the generator in such a manner as to compensate for the varying rotational speed of the generator rotor. The electronic apparatus disclosed in U.S. Pat. No. 3,070,470 requires multiple rotating pulse transformers and is unduly complex. Additionally, the apparatus does not provide means for successfully operating the generator in parallel with other sources of generated electrical power.

In U.S. Pat. Nos. 2,829,333, 4,510,433, and 3,084,324 there is disclosed various undesirably complex arrangements for determining the proper value of the variable AC frequency to be applied to the wound-rotor of a synchronous generator. In addition, they describe involved methods for generating the requisite compensating AC frequency, as well as complicated techniques for applying such AC frequency to the windings in the wound-rotor of the generator.

The apparatus disclosed in the preceding three patents include either rotor-mounted electronic circuits, or commutators and brushes, or other complex and awkward devices subject to wear and to failure in operation.

U.S. Pat. No. 4,400,659 teaches the use of a cycloconverter (described as a differential frequency-converter)

mounted on the shaft of the generator, similar to U.S. Pat. No. 3,070,470. U.S. Pat. No. 4,400,659 teaches the use of a frequency detector to compare the generator output frequency with the AC frequency of the AC mains of electric utility power lines connected in parallel with the output of the generator.

The flaw in this arrangement is that once the generator output has been connected to the AC mains of the electric utility lines, the frequency detector senses only the AC frequency of the AC mains of the electric utility lines, and thus no comparison can be made.

U.S. Pat. No. 4,400,659 discloses an arrangement to measure the difference between the generated AC frequency output of the generator and the AC frequency of the parallel connected AC mains of the electric utility lines, and to make appropriate corrections when such generated AC frequency is different from that of the parallel connected AC mains of the electric utility lines. However, the flaw with this arrangement is that a synchronous generator connected in parallel with the AC mains of electric utility lines cannot generate an AC frequency different from that of the AC mains until after the generator has "pulled out" of synchronism with the AC mains. Once the generator has pulled out of synchronism with the AC mains, circuit protector means must immediately disconnect the synchronous generator from the AC mains before the synchronous generator windings are damaged by the undesirably large fault currents that will flow in the armature windings of the synchronous generator that is out of synchronism with connected AC mains. The magnitude of these currents is limited only by the small impedance of the generator stator armature windings opposing the full line voltage of the AC mains of the electric utility lines. In this regard, it can be seen that the apparatus taught in U.S. Pat. No. 4,400,659 does not provide means for successfully operating a variable speed, constant frequency (VSCF) generator in parallel with the AC mains of an electric utility power system.

One of the conditions that must be met before the output of a synchronous generator can be connected in parallel with electric utility power lines is that the output voltage of the incoming synchronous generator must be "in phase" with the voltage of the electric utility power lines.

Being "in phase" means that the difference between the instantaneous voltage of phase A of one system and phase A of the other system is zero. Similarly, at the same time, the instantaneous difference in voltage is zero between phases B and C of one system and the respective phases B and C of the other system. The differences between the instantaneous voltages of each corresponding pair of phases must be zero at the time the two three-phase systems are connected in parallel.

When conventional synchronous generators are to be connected to operate in parallel with electric utility lines or other synchronous generators, the speed, and thus the generated AC frequency, of the incoming generator is purposely made to be slightly different from that of the electric utility power line or other synchronous generator power system until one system catches up with the other system and the two systems are in phase. The circuit breaker connecting the two systems is closed at the instant when all three phases of the generator output are in phase with all three phases of the electric utility power lines or other synchronous generator power system.

In the case of variable speed, constant frequency (VSCF) generators, where the generated AC frequency of the VSCF generator is essentially constant, special steps must be taken to shift the phase of the output voltage of the VSCF generator to bring it in phase with the voltage of the AC mains of the electric utility lines or other synchronous generator systems before connection is made.

Once the output of the VSCF generator has been connected to the electric utility power lines, special steps must be taken to vary the "power angle" or "displacement angle" between the rotor magnetic field and the armature flux field of the variable speed constant frequency generator in order to control the power output of the synchronous generator while still maintaining a constant frequency output power.

The "power angle" or "displacement angle" is defined as the angle, in electrical degrees, between the angular orientation of the rotating armature magnetic flux vector and the angular orientation of the rotating field magnetic flux vector in the generator. The magnitude of the power angle or displacement angle determines the magnitude of the power output of the synchronous machine. In a synchronous motor, the field magnetic flux vector lags behind the armature magnetic flux vector. In a synchronous generator, the field magnetic flux vector leads the armature magnetic flux vector.

In the case of a conventional synchronous generator connected to the AC mains of an electrical utility power system, increasing the mechanical power input to the power input shaft of the generator causes the rotor and its associated magnetic field to pull ahead of the rotating synchronous armature magnetic flux vector, thereby increasing the power angle or displacement angle. This increase in the displacement angle between the angular orientation of the armature magnetic flux vector and the angular orientation of the rotor field magnetic flux results in increased power output from the generator.

The power angle or displacement angle increases until the power output from the generator, plus the internal power losses of the generator, equals the power input applied to the power input shaft of the generator. Reducing the mechanical power input to the generator results in a reduction of the power angle and a reduction in the power output from the generator. The AC frequency of the generator output does not vary during the momentary change of power angle or displacement angle. Only the relative angular positions of the rotor magnetic field vector and the armature flux field vector change.

A variable speed constant frequency (VSCF) generator operating in parallel with electric utility lines or other synchronous electric power systems requires special means, not heretofore disclosed in the prior art, to control the power angle, and thus the power output from the VSCF generator, under changing load conditions while still maintaining a constant frequency AC power output.

The internal distribution of power flow in a VSCF generator with AC excitation power in its magnetic field windings, while operating at speeds other than synchronous speed, is exactly like that of the well known wound-rotor induction motor frequency changer. The relative portion of the output power generated by the mechanical rotation of the mechanical structure of the rotor is defined as the ratio: (Rotor RPM]/Synchronous RPM]×(Power Output). The remainder of the generated output power is supplied by the transformer action of the AC power in the magnetic field windings.

For example, if a 90 KW 4-pole 60 HZ (1800 RPM synchronous speed) VSCF generator is operating with an input shaft speed of 1200 RPM, [(1200/1800)×90 KW=60 KW] of the output power is generated at 40 HZ in the armature windings by the rotation of the mechanical structure of the rotor, and [(600/1800)×90 KW=30 KW] of the output power is generated at 20 HZ in the armature windings by the transformer action of the 20 HZ AC power in the field windings in the rotor of the generator, for a total of 90 KW at 60 HZ.

Therefore, a practical VSCF generator must provide means to generate the "makeup power" or the difference between the output power of the generator and the power generated directly by the mechanical rotation of the generator rotor. In the prior art, only the U.S. Pat. No. 3,070,470, without adequately solving the problem, addresses the distribution of power flow in a VSCF generator operating at speeds other than synchronous speed.

In summary, it is known in the prior art that the output AC frequency from a synchronous generator can be maintained at a precise fixed value, regardless of the variation of the rotational velocity of the input shaft and rotor structure of the generator, by applying controllably varying AC to the appropriately designed electromagnetic windings of the rotor of the generator. However, the techniques taught in the prior art are unduly large, complex, costly, or subject to unwanted early failures. Additionally, the prior art does not teach a practical method for controlling the phase relationship between the generated voltage of the VSCF generator and the voltage of other synchronous generators, nor does the prior art teach a practical method for controlling the power angle or displacement angle of a VSCF generator connected in parallel with other synchronous generators or the AC mains of electrical utility lines. Therefore, it would be highly desirable to have a new and improved variable speed constant frequency synchronous power generating system which can operate in parallel with other synchronous generators or with electric utility power lines for co-generation of power. Such a new and improved system should use a simple, practical VSCF generator which can operate successfully in either a stand-alone mode or in parallel with other synchronous generator systems.

DISCLOSURE OF INVENTION

Therefore, the principal object of the present invention is to provide a new and improved synchronous variable speed constant frequency power generating system and method of using it, whereby electrical power can be generated in a relatively inexpensive and effective manner without being subject, under ordinary circumstances, to early failures.

A further object of the present invention is to provide such a new and improved power generating system and method to control the rotational velocity of an electromagnetic field about the axis of a synchronous generator rotor to compensate for variations in the rotational velocity of the rotor with respect to the stator armature windings of the generator.

Another object of the present invention is to provide such a new and improved power system and method to maintain substantially a constant rotational velocity of the electromagnetic field of a synchronous generator with respect to the stator armature windings of the generator to, in turn, maintain substantially a constant AC frequency in the generated output power from the generator.

Yet another object of the present invention is to provide such a new and improved power system and method to synchronize the output from a VSCF generator with the AC output of another synchronous generator or with the AC voltage of the AC mains of electric utility power systems so that the inventive VSCF generator can be properly connected electrically in parallel with other synchronous generators or with electric utility power lines.

A further object of the present invention is to provide such a new and improved power system and method for varying controllably the power angle or displacement angle of the VSCF generator and to thus control the power output of the VSCF generator of this invention while the generator output is connected electrically in parallel with other synchronous generators or with electric utility power lines.

Still another object of the present invention is to provide such a new and improved power system and method to distribute internally the power flow required for proper operation of a VSCF generator when the generator rotor is operating at rotational speeds other than at a synchronous speed.

Briefly, the above and further objects of the present invention are realized by providing a new and improved synchronous generator constant frequency control system and method of using it.

A variable speed constant frequency synchronous generating system and method includes rotatable generator rotor shaft and reference members and means for changing the relative angular position of the electromagnetic field on the generator rotor in response to a change in the relative angular positions between the generator shaft and reference members. The reference member is adapted to rotate at a reference speed coaxially about the generator rotor shaft. In this manner, the AC frequency of the generated output alternating current from a synchronous generator can be maintained substantially fixed, and the generated output AC frequency is substantially independent of the rotational speed of the power input shaft and rotor of the synchronous generator.

The synchronous variable speed constant frequency generating system and method includes means to essentially instantaneously compare the electrical angle versus time relationship of the AC output voltage, which is substantially a sine wave, of the VSCF generator of this invention with the electrical angle versus time relationship of a reference AC voltage, which is substantially a sine wave. The synchronous variable speed constant frequency generating system and method also includes means for changing the relative angular position of the electromagnetic field relative to the generator rotor in response to a change in the relative electrical angle versus time of the generator output voltage as compared to the electrical angle versus time relationship of the reference voltage.

A device controllably varies the phase relationship between the output voltage of the synchronous generator and the voltage of the separate, not connected, AC mains of electric utility lines or other synchronous generators.

In accordance with the present invention, a device controllably varies the power angle of the generator and thus the power output from the synchronous generator when the generator is connected in parallel with the AC mains of electric utility lines or other synchronous generators.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
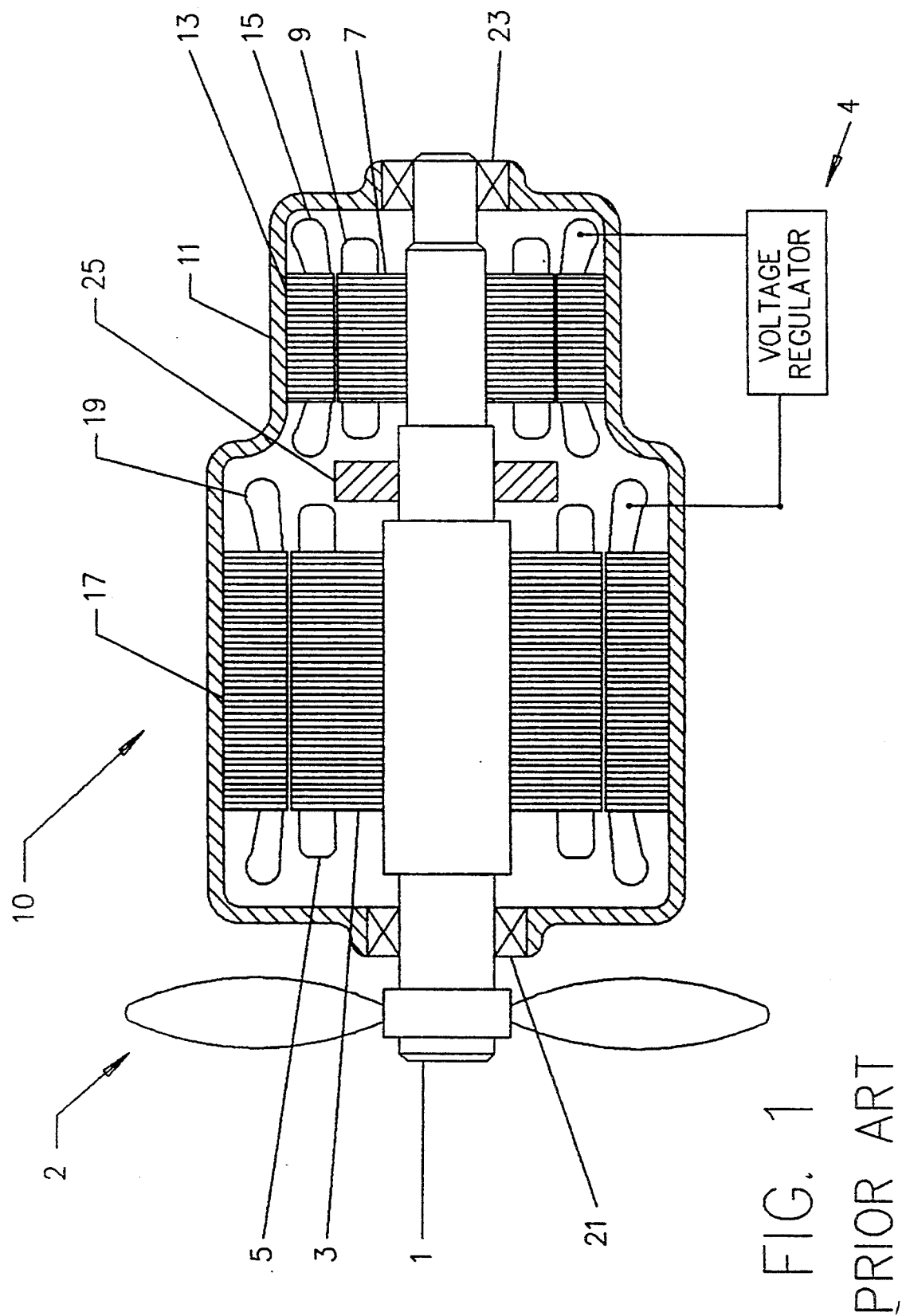
FIG. 1 is a diagrammatic sectional view of a prior art synchronous generator with a built-in brushless exciter and rotating rectifiers.
Figure 2:
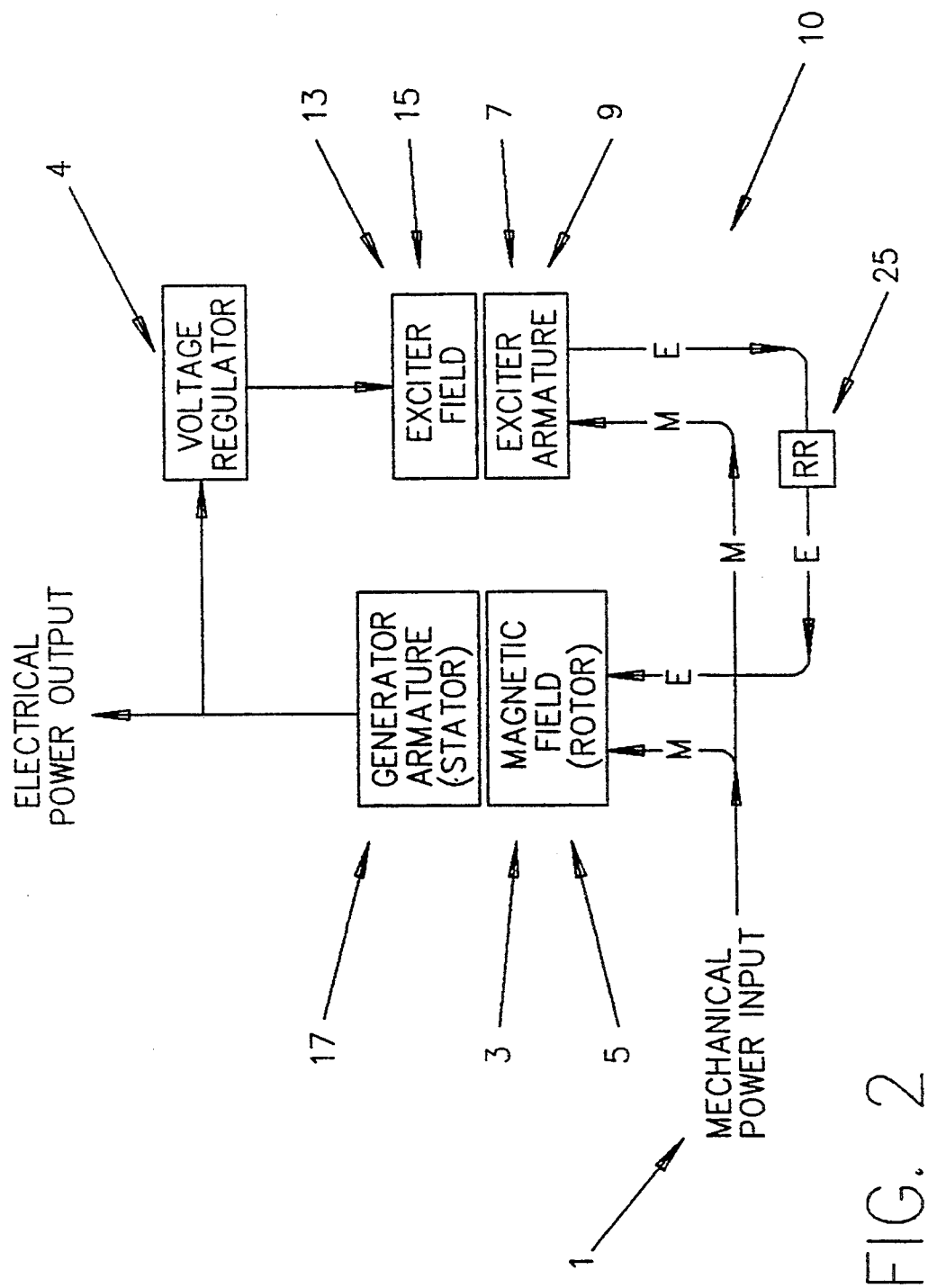
FIG. 2 is a flow diagram showing the flow of mechanical and electrical energy in the prior art synchronous generator of FIG. 1.

Referring now to the drawings, and more particularly to FIGS. 1 and 2, there is shown a prior art conventional synchronous generator 10.

In operation, a prime mover 2 rotates a generator power input shaft 1 at a constant speed such as 1800 RPM for a 4-pole 60 HZ generator. A generator rotor structure 3, containing generator electromagnetic field windings 5, is mounted on and rotates with the generator power input shaft 1. A brushless exciter armature structure 7 including brushless exciter armature windings 9 is also mounted on and rotates with the generator power input shaft 1 which is supported on bearings 21 and 23. A generator housing 11 supports a stationary brushless exciter field structure 13 including brushless exciter electromagnetic field windings 15. The generator housing 11 also supports a stationary generator stator structure 17 which contains generator armature windings 19.

In the operation of the prior art synchronous generator of FIG. 1, a voltage regulator 4 provides controllably variable electric current to the brushless exciter electromagnetic field windings 15 which sets up an electromagnetic field in the brushless exciter field structure 13. The interaction between the electromagnetic field in the brushless exciter field structure 13 and the rotating brushless exciter armature windings 9 generates a 3-phase AC voltage in the brushless exciter armature windings 9. This 3-phase AC voltage causes 3-phase AC current to flow into a rotating rectifier assembly 25 mounted on the generator power input shaft 1. The rotating rectifier assembly 25 rectifies the AC current into DC current which in turn flows into the generator electromagnetic field windings 5, establishing an electromagnetic field in the generator rotor structure 3. The interaction between the rotating electromagnetic field established in the rotating generator rotor structure 3 and the stationary generator armature windings 19 generates a voltage in the generator armature windings 19. This voltage is the generated output voltage of the generator. The voltage regulator 4 monitors the generated output voltage and varies the excitation current to the brushless exciter electromagnetic field windings 15 as required to maintain the generated output voltage from the generator armature windings 19 at a predetermined value.

Considering now the power flow of the conventional synchronous generator 10 in greater detail, with reference to FIG. 2, there is shown a flow diagram of the prior art synchronous generator of FIG. 1. The generator power input shaft 1 is physically connected to both the brushless exciter armature structure 7 and the generator rotor structure 3 and provides a mechanical power input to the synchronous generator 10 in the: form of rotational energy. In this way, a rotational force is applied to the brushless exciter armature structure 7 and the generator rotor structure 3. The symbol M in FIG. 2 denotes mechanical energy.

The electric current supplied to the brushless exciter electromagnetic field windings 15 from the voltage regulator 4 creates an electromagnetic field in the brushless exciter field structure 13. The interaction between the stationary electromagnetic field in the brushless exciter field structure 13 and the rotating brushless exciter armature windings 9 generates a 3-phase AC voltage in the brushless exciter armature windings 9. This 3-phase AC voltage causes 3-phase AC current to flow into the rotating rectifier assembly 25 mounted on the generator power input shaft 1. The rotating rectifier assembly 25 rectifies the AC current into DC current which in turn flows into the generator electromagnetic field windings 5 to establish an electromagnetic field in the generator rotor structure 3. The interaction between the electromagnetic field established in the rotating generator rotor structure 3 and the stationary generator armature windings 19 generates a voltage in the generator armature windings 19. This voltage is the generated output voltage of the generator. The voltage regulator 4 monitors the generated output voltage and varies the excitation current to the brushless exciter electromagnetic field windings in the brushless exciter field structure 13 as required to maintain the generated output voltage from the generator armature windings 19 at a predetermined value.

Figure 3:
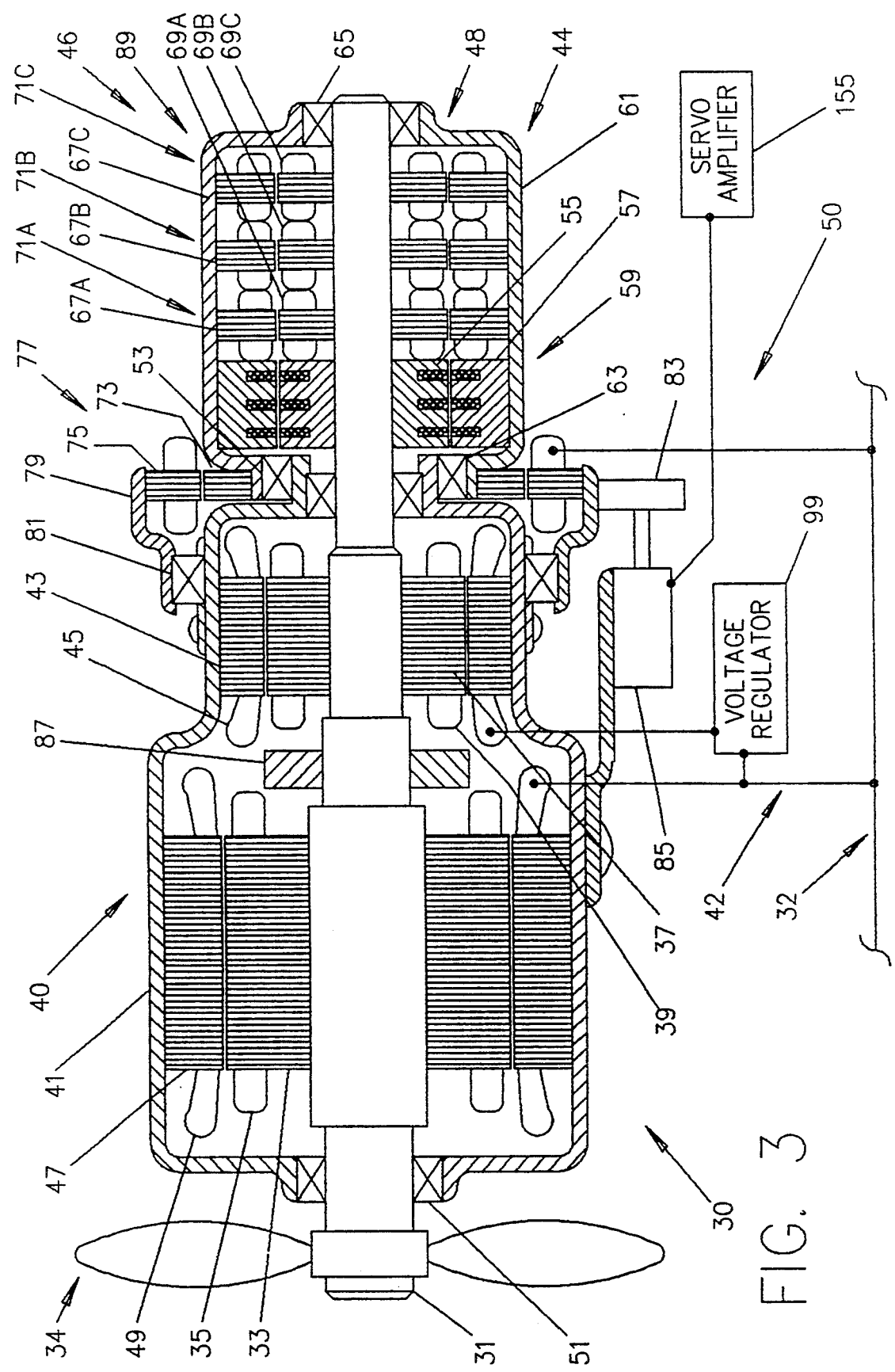
FIG. 3 is a diagrammatic sectional view of a variable speed constant frequency power generating system which is constructed in accordance to the present invention.

Referring now to FIG. 3 thereof, there is shown a synchronous variable speed constant frequency (VSCF) electrical power generating system 30 which is constructed in accordance to the present invention. The VSCF electrical power generating system 30 is illustrated connected between a parallel source of electrical power 32 and a prime mover 34, such as a windmill turbine indicated generally as a prime mover 34 when the VSCF electrical power generating system 30 is utilized for co-generation of electrical power. However, it is to be understood by those skilled in the art that the inventive generating system can have many other applications as well.

The mechanical energy generated by the prime mover 34 is coupled to the VSCF electrical power generating system 30 by a rotatable generator power input shaft 31 which rotates at a variable rate between a maximum rotational rate and a minimum rotational rate depending upon the energy delivered by the prime mover 34.

As best seen in FIG. 3, the VSCF electrical power generating system 30 generally includes a synchronous variable speed constant frequency (VSCF) generator 40 for producing constant frequency alternating current (AC) electrical power 42, a rotating reference member arrangement or primary unit 44 coupled to a synchronous motor 77 energized by the parallel source of electrical power 32 for establishing a desired reference rate of rotation of the rotating reference member or primary unit 44, a shaft member arrangement or rotating secondary unit 48 coupled to the generator power input shaft 31 for producing an essentially continuous indication of the essentially instantaneous position of the generator power input shaft 31 relative to the primary unit 44, and an electrical energy coupling or transformer unit indicated generally at 46 for variably coupling the electrical energy from brushless exciter armature windings 39 to main generator rotating polyphase electromagnetic field windings 35 to adjust the position of the electromagnetic field relative to a generator rotor structure 33 in response to a change in the relative position of the reference member arrangement or primary unit 44 with respect to the rotating secondary unit 48.

As will be explained hereinafter in greater detail, the transformer unit 46 acts to energize the main generator rotating polyphase electromagnetic field windings 35 in such a manner as to maintain the same essentially instantaneous relative position of the main generator electromagnetic field with respect to the generator rotor structure 33 as the essentially instantaneous relative position of the rotating primary unit 44 with respect to the rotating secondary unit 48. As a consequence, the rotational speed of the main rotor electromagnetic field relative to generator stator armature windings 49 is essentially the same as the rotational speed of the primary unit 44 relative to the generator stator armature windings 49. In this regard, the AC frequency of the electrical power 42 generated by the VSCF generator 40 is maintained at an essentially constant frequency which essentially corresponds to the AC frequency of the parallel source of electrical power 32 which energizes the synchronous motor 77 to determine the rotational speed of the primary unit 44.

Figure 4:
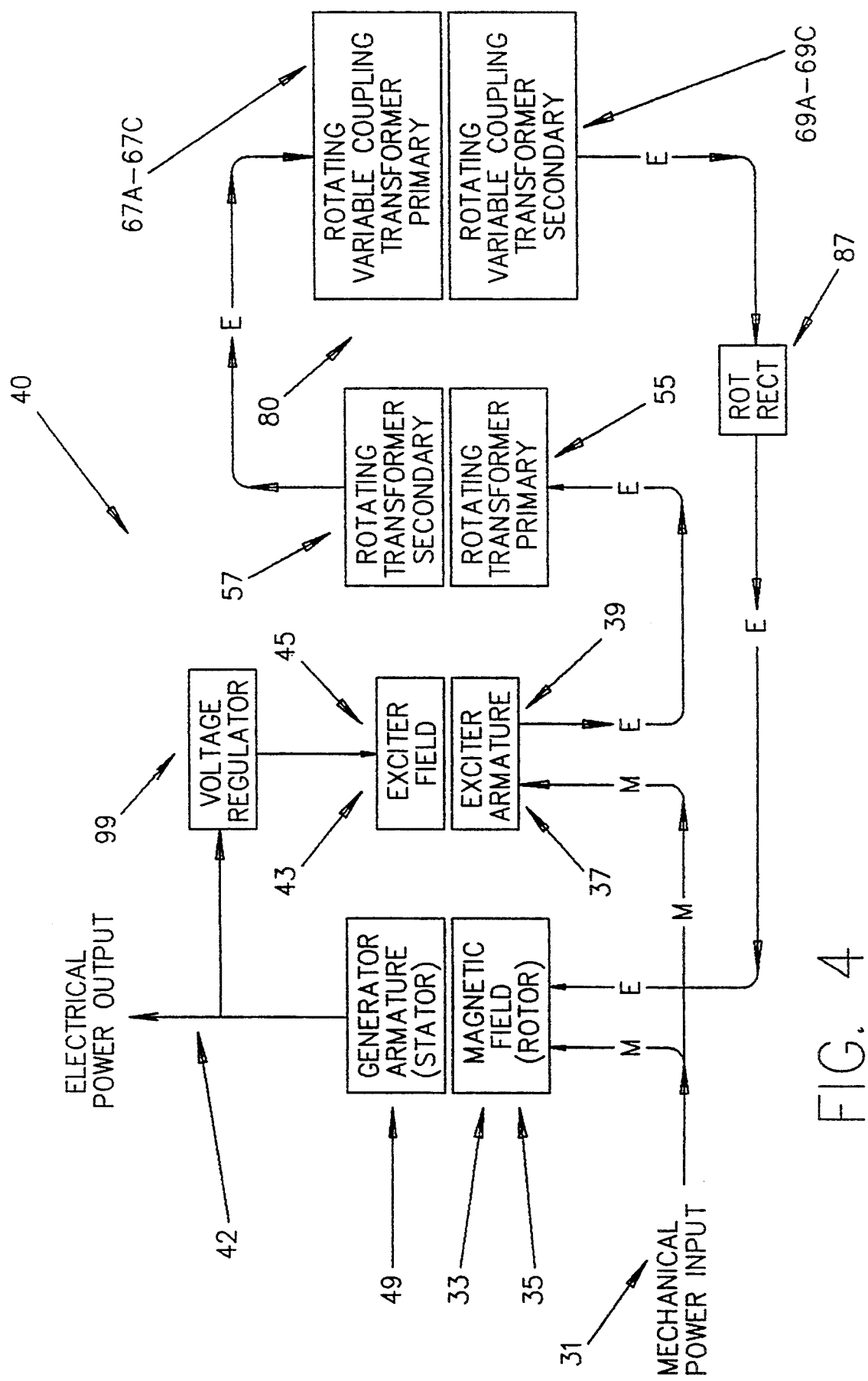
FIG. 4 is a flow diagram showing the flow of mechanical and electrical energy in the variable speed constant frequency power generating system of FIG. 3.

Considering now the electrical power generating system 30 in greater detail, with reference to FIGS. 3 and 4, the VSCF generator 40 includes the generator rotor structure 33 attached to the rotatable generator power input shaft 31 and containing rotating polyphase electromagnetic field windings 35 for producing a rotating electromagnetic field. A brushless exciter armature structure 37 containing brushless exciter armature windings 39 to provide a source of three phase alternating current within the VSCF generator 40 is also mounted on and rotates with the generator power input shaft 31 which is supported on bearings 51 and 53. A generator housing 41 supports a stationary brushless exciter field structure 43 containing brushless exciter electromagnetic field windings 45. The generator housing 41 also supports a stationary generator stator structure 47 which contains generator stator armature windings 49.

Coupled to the VSCF generator 40 are the primary and secondary units 44 and 48 respectively which form a rotating variable-coupling transformer arrangement (RVCT) 89 for helping to synchronize the AC frequency of the generated power from the VSCF generator 40 with AC frequency of the parallel source of electrical power 32 energizing the synchronous motor 77.

The RVCT 89 includes the rotatable primary unit 44 having three reference members or 1-phase primaries 67A–67C, each of which is supplied with a separate phase of the three phase alternating current from the brushless exciter armature windings 39. As will be explained hereinafter, the primary unit 44 is rotated by a synchronous motor 77 at a reference speed while the rotating secondary unit 48, coupled to the generator power input shaft 31, rotates at the speed of the generator rotor structure 33 and the generator power input shaft 31.

A 3-phase rotating transformer 59 is disposed between the brushless exciter armature windings 39 and the windings of the three 1-phase primaries 67A–67C of the primary unit 44 to connect the source of three phase alternating current to the primary unit 44.

The primary unit 44 and the secondary unit 48 are free to rotate relative to one another. The rotating secondary unit 48 includes three 3-phase secondaries 69A–69C, each of which corresponds to one of the reference member 1-phase primaries 67A–67C in primary unit 44 in such a way that each reference primary member rotates coaxially about its associated shaft secondary member.

Considering now the variable speed constant frequency VSCF generator 40 in still greater detail, the brushless exciter armature windings 39 are coupled electrically, through the 3-phase rotating transformer 59, to the RVCT 89 formed by the three 1-phase primaries 67A–67C and the three 3-phase secondaries 69A–69C. In this regard, the RVCT 89 is electrically interposed between the brushless exciter armature windings 39 and the circuitry of the polyphase electromagnetic field windings 35 in the generator rotor structure 33.

The RVCT 89 controllably variably couples the AC output from the brushless exciter armature windings 39 or other source of excitation power to the circuitry of the polyphase electromagnetic field windings 35 in the generator rotor structure 33 of the VSCF generator 40.

In this regard, the function, operation and purpose of the RVCT 89 is analogous to that of one form of a device known to practitioners of the art of servomechanisms as a "synchro transmitter." A synchro transmitter is also known as an "Autosyn" or "Selsyn." A synchro transmitter is one form of a variable coupling transformer.

Considering now the synchro transmitter in greater detail, a conventional prior art synchro transmitter generally includes an outer stator which contains the 3-phase AC windings of the secondary of the variable coupling transformer, and an inner salient pole rotor having a single-phase AC electromagnetic field winding to form the primary of the variable coupling transformer.

The electromagnetic field winding of the prior art synchro transmitter is excited with 1-phase AC power. Thus, the AC power in the rotor or primary of the prior art synchro transmitter generates AC power in the 3-phase stator windings or secondary windings of the synchro transmitter by transformer action.

The magnitude of the AC power induced in each of the three windings of the secondary of the prior art synchro transmitter depends on the alignment of each of the three secondary windings with the axis of the 1-phase primary winding of the synchro transmitter.

In one form of a prior art servomechanism system, the 3-phase secondary windings of the synchro transmitter are connected to the 3-phase windings of a remote prior art synchro receiver, so that there are circuits for the flow of electric currents in the circuit comprising the secondary windings of the variable coupling transformer synchro transmitter and the windings of the synchro receiver.

The AC currents in the 3-phase windings of the secondary of the prior art synchro transmitter set up an AC magnetic field in the secondary of the synchro transmitter. The axis of this AC magnetic field in the 3-phase secondary of the synchro transmitter is always aligned with the axis of the AC magnetic field in the 1-phase primary of the synchro transmitter.

The prior art synchro receiver electric windings are arranged and connected to the secondary windings of the synchro transmitter in such a manner that the orientation or alignment of the AC magnetic field of the synchro receiver relative to the structure of the synchro receiver is essentially an exact duplicate of the orientation of the AC magnetic field in the secondary of the prior art synchro transmitter relative to the structure of the secondary of the synchro transmitter.

The orientation of the AC magnetic field in the secondary of the prior art synchro transmitter relative to the structure of the secondary of the synchro transmitter is determined by the alignment of the 1-phase primary of the synchro transmitter relative to the structure of the secondary of the synchro transmitter.

Thus, the orientation of the magnetic field in the prior art synchro receiver relative to the mechanical structure of the synchro receiver is determined by the relative orientation or alignment of the primary member or rotor of the prior art synchro transmitter with the windings and structure of the secondary of the synchro transmitter.

In the present invention, the function of the RVCT 89 is analogous to that of the prior art synchro transmitter described previously, while the function of the synchronous generator rotor structure 33 and rotating polyphase electromagnetic field windings 35 is analogous to that of the prior art synchro receiver described previously.

In this regard, the RVCT 89 in the present invention is constructed as an inside-out analogy of the prior art synchro transmitter for ease of construction and assembly.

In the present invention, the alignment or orientation of the main magnetic field relative to the generator rotor structure 33, is essentially always an exact duplicate of the orientation or alignment of the RVCT 1-phase primaries 67A–67C relative to the RVCT 3-phase secondaries 69A–69C.

It should be noted that the major difference between the RVCT 89 in the present invention and the synchro transmitter of the prior art, other than physical size, is that both the RVCT 3-phase secondaries 69A–69C and 1-phase primaries 67A–67C are free to rotate about the axis of the RVCT 89, while generally only the primary of the prior art synchro transmitter is made to be free to rotate about the axis of the prior art synchro transmitter.

In this regard, the RVCT 89 has a rotatable housing 61 that contains the 1-phase primaries 67A–67C and which are free to rotate coaxially about the 3-phase secondaries 69A–69C which are mounted on and rotate with the generator power input shaft 31.

As the RVCT 3-phase secondaries 69A–69C are attached to the generator power input shaft 31 driving the VSCF generator rotor structure 33, the 3-phase secondaries 69A–69C essentially rotate with the generator rotor structure 33.

In an exemplary apparatus of the preferred form of the present invention for the operation of a 4-pole VSCF generator producing 60 HZ AC (1800 RPM synchronous speed), the rotatable housing 61 containing the 1-phase primaries 67A–67C is independently driven at exactly 1800 RPM by the synchronous motor 77.

When the generator rotor structure 33 and power input shaft 31 and the mechanically connected 3-phase secondaries 69A–69C are rotating at 1800 RPM, the 1-phase primaries 67A–67C, rotating at exactly 1800 RPM, are effectively standing still relative to the 3-phase secondaries 69A–69C rotating at 1800 RPM. Since there is no change in the relative position between the RVCT 1-phase primaries 67A–67C and the 3-phase secondaries 69A–69C, the position of the electromagnetic field on the generator rotor structure 33 does not change relative to the generator rotor structure 33, and the electromagnetic field rotates at 1800 RPM relative to the generator stator armature windings 49.

When the generator rotor structure 33 and power input shaft 31 and the mechanically connected 3-phase secondaries 69A–69C are rotating at 1790 RPM, the 1-phase primaries 67AC, rotating at exactly 1800 RPM, are effectively moving forward at 10 RPM with respect to the 3-phase secondaries 69A–69C rotating at 1790 RPM.

When the 1-phase primaries 67A–67C, rotating at 1800 RPM, are moving forward at 10 RPM relative to the 3-phase secondaries 69A–69C rotating at 1790 RPM, the action of the rotating variable-coupling transformer arrangement of RVCT 89 causes the electromagnetic field in the generator rotor structure 33 to move forward at 10 RPM relative to generator rotor structure 33 rotating at 1790 RPM.

The result is that the main electromagnetic field of the VSCF generator 40 continues to rotate at 1800 (1790+10) RPM, and the frequency of the generated AC power from the VSCF generator 40 remains essentially at exactly 60 HZ.

When the generator rotor structure 33 and power input shaft 31 and the mechanically connected 3-phase secondaries 69A–69C are rotating at 2000 RPM, the 1-phase primaries 67A–67C, rotating at exactly 1800 RPM, are effectively moving backward at 200 RPM with respect to the 3-phase secondaries 69A–69C rotating at 2000 RPM.

When the 1-phase primaries 67A–67C, rotating at 1800 RPM, are moving backward at 200 RPM relative to the 3-phase secondaries 69A–69C rotating at 2000 RPM, the action of the rotating variable-coupling transformer arrangement of RVCT 89 causes the electromagnetic field in the generator rotor structure 33 to move backward at 200 RPM relative to generator rotor structure 33 rotating at 2000 RPM.

The result is that the main electromagnetic field of the VSCF generator 40 continues to rotate at 1800 (2000−200) RPM, and the frequency of the generated AC power from the VSCF generator 40 remains at exactly 60 HZ.

Similar corrective action takes place whenever the rotational speed of the generator rotor structure 33 and the attached 3-phase secondaries 69A–69C differ from the reference speed of the 1-phase primaries 67A–67C.

It is to be understood from the foregoing that the apparatus and method of the invention do not measure speed directly, because any speed measurement involves the element of time which would cause a time lag in the corrective action. Instead, the corrected speed of the electromagnetic field is a consequence of the action of the apparatus and the method that essentially continuously and instantaneously maintains the position of the electromagnetic field relative to the generator rotor structure 33 the same as the position of the primary unit 44 relative to the secondary unit 48.

From the foregoing, it will be understood by those skilled in the art that, as a consequence, the speed of rotation of the electromagnetic field of the VSCF generator 40 relative to a fixed point in space such as the fixed generator stator structure 47 of the VSCF generator 40 is the same as the speed of rotation of the RVCT 1-phase primaries 67A–67C relative to a fixed point in space such as the fixed generator stator structure 47 of the VSCF generator 40.

In this regard, the RVCT 89 does not generate any electric power or any alternate AC frequency. The RVCT 89 serves only as a variable coupling transformer to controllably variably couple the source of the electromagnetic field excitation power to the circuitry of the rotating polyphase electromagnetic field windings 35 in the generator rotor structure 33 of the synchronous VSCF generator 40.

Moreover, as the RVCT 89 does not generate power, and since the RVCT 89 is constructed as a three phase transformer where all electromagnetic forces cancel, the RVCT 89 also does not develop any rotational torque.

As a result, the device used to rotate the RVCT 1-phase primaries 67A–67C must overcome only the windage and friction of the structure carrying the rotating RVCT single-phase primaries 67A–67C.

In a Wind Energy Conversion System (WECS) where the electrical power 42 of the VSCF generator 40 of the present invention is connected to electric utility power lines in order to furnish power to the electric grid, the synchronous motor driving the reference member 1-phase primaries 67A–67C is connected to the electric utility lines. Thus the AC frequency of the generated output of the generator of this invention is automatically always equal to the AC frequency of the electric utility power lines.

In stand-alone engine-driven applications of the generator of this invention, the small synchronous motor 77 driving the 1-phase primaries 67A–67C can be powered by the output from a quartz-clock-controlled electronic inverter (not shown).

Considering now the synchronous motor 77 in greater detail, the synchronous motor 77 generally includes a rotor 73 for driving the 1-phase primaries 67A–67C and a synchronous motor stator 75 energized by the parallel source of electric power 32 to rotate the rotor 73 so that it rotates at a synchronous speed determined by the AC frequency of the parallel source of electric power 32.

The synchronous motor rotor 73 driving the 1-phase primaries 67A–67C in the present invention is attached directly to the rotatable housing 61 containing the single-phase primaries 67A–67C. Alternately, the synchronous motor rotor 73 can be connected to the 1-phase primaries 67A–67C by means of gears or drive belts (not shown).

The synchronous motor stator 75 of the synchronous motor 77 can be fixed to a stationary member (not shown) of the generator apparatus when used with a stand-alone VSCF generator.

When the inventive VSCF generator system is designed to operate in parallel with the AC mains of electric utility lines or other synchronous generators acting as the parallel source of electrical power 32, the synchronous motor stator 75 driving the 1-phase primaries 67A–67C is mounted in a synchronous motor housing 79 that is free to rotate about its own axis for reasons to be explained.

The synchronous motor housing 79 is restrained from freely rotating about its axis by a servo controlled drive system 50 which includes a drive mechanism 83 driven by a servo motor 85, which is mounted externally on the VSCF generator 40, and which can either hold the synchronous motor housing 79 and the synchronous motor stator 75 in a fixed position or can controllably cause the synchronous motor housing 79 and the synchronous motor stator 75 to rotate about their common axis at a controlled speed and in a controlled direction.

The 1-phase primaries 67A–67C are driven by the small synchronous motor 77 and thus rotate at exactly the same speed as the rotating armature flux field in the synchronous motor stator 75, relative to a fixed point in space such as the fixed generator stator structure 47 of the VSCF generator 40.

As shown previously, the action of the RVCT 89 causes the electromagnetic field on the generator rotor structure 33 to rotate at essentially exactly the same speed, relative to the fixed VSCF generator stator structure 47, as do the 1-phase primaries 67A–67C of the RVCT primary unit 44, relative to the fixed VSCF generator stator structure 47. Thus, the electromagnetic field in the VSCF generator rotor structure 33 rotates at essentially exactly the same speed, relative to the fixed VSCF generator stator structure 47, as does the rotating armature flux field in the synchronous motor stator 75, relative to the fixed VSCF generator stator structure 47.

Since both the electromagnetic field in the VSCF generator rotor structure 33, and the armature flux field established in the synchronous motor stator 75 by the parallel source of electrical power 32 essentially always rotate at the same speed relative to a fixed point in space such as the generator stator armature windings 49, it can be concluded that there is a fixed angular position, as a function of time, relationship between the rotating electromagnetic field on the VSCF generator rotor structure 33 and the rotating armature flux field in the synchronous motor stator 75.

Rotating the synchronous motor stator 75 about its own axis effectively changes the angular position, as a function of time, relationship of the synchronous motor rotating armature flux field relative to the fixed generator stator structure 47.

As a consequence, rotating the synchronous motor stator 75 about its own axis changes the angular position, as a function of time, relationship between the rotating electromagnetic field on the VSCF generator rotor structure 33 and the fixed generator stator structure 47.

When the generator stator armature winding 49 of the VSCF generator 40 is connected to the AC mains of the parallel source of electrical power 32, the parallel source of electrical power 32 establishes a rotating armature flux field in the generator stator structure 47. This rotating armature flux field has a fixed specific angular position, as a function of time, relationship with the generator stator structure 47.

At the instant that the VSCF generator stator armature windings are connected to the AC mains of the parallel source of electric power 32, the angular position, as a function of time, relationship of the electromagnetic field on the generator rotor structure 33 with respect to the generator stator structure 47 must be essentially the same as the angular position, as a function of time, relationship of the armature flux field established by the parallel source of electrical power 32 with respect to the same generator stator structure 47.

As described previously, rotating the synchronous motor stator 75 about its own axis changes the angular position, as a function of time, relationship between the rotating electromagnetic field on the VSCF generator rotor structure 33 and the fixed generator stator structure 47. As a consequence, said rotation changes the relationship of the angular position, as a function of time, of the rotating electromagnetic field on the VSCF generator rotor structure 33 relative to the specific angular position, as a function of time, of the rotating armature flux field established by the parallel source of electrical power 32 in the generator stator structure 47.

Thus, controlled rotation of the synchronous motor stator 75 about its own axis provides the means whereby the angular position, as a function of time, of the electromagnetic field on the VSCF generator rotor structure 33 relative to the angular position, as a function of time, of the rotating armature flux field established by the parallel source of electrical power 32 in the fixed generator stator structure 47 can be controllably varied.

As a consequence, controlled rotation of the synchronous motor stator 75 about its own axis provides the means whereby the voltage of the output electrical power 42 of the VSCF generator 40 can be brought into phase with the voltage of the AC mains of the parallel source of electrical power 32 prior to connection of the output electrical power 42 of the VSCF generator 40 to the AC mains of the parallel source of electrical power 32.

After the output electrical power 42 of the VSCF generator 40 has been connected to the AC mains of the parallel source of electrical power 32, controlled rotation of the synchronous motor stator 75 about its own axis provides the means whereby the power angle, and thus the magnitude of the power output, of the VSCF generator 40 can be controllably varied.

In a WECS application of the present invention, for example, the small synchronous motor 77 driving the RVCT 1-phase primaries 67A-67C derives its AC power from the AC mains of the electric utility lines or other synchronous generators. Rotating the synchronous motor stator 75 about its own axis effectively changes the phase relationship between the output voltage of the VSCF generator 40 and the voltage of the parallel source of electric power 32.

Additionally, once the output of the VSCF generator 40 has been connected in parallel with the parallel source of electrical power 32, the power angle, and thus the power output, of the VSCF generator 40 can be controlled by controllably rotating the synchronous motor stator 75.

In one example of the method for connecting the output of the VSCF generator 40 of the present invention to a parallel source of electrical power 32:

The phase relationship of the output voltage of the VSCF generator 40 and the voltage of the parallel source of electrical power 32 is determined by means of a phase comparator or synchroscope (not shown). The phase comparator or synchroscope (not shown) essentially compares the instantaneous electrical angle, as a function of time, of the generated voltage of the VSCF generator 40 with the instantaneous electrical angle, as a function of time, of the voltage of the parallel source of electrical power 32.

The small synchronous motor stator 75 driving the RVCT 1-phase primaries 67A-67C is rotated about its axis until the voltages of the two systems are fully in phase as determined by the phase comparator or synchroscope.

The synchronous motor stator 75 driving the 1-phase primaries 67A-67C is held fixed in position, relative to its axis, maintaining the in-phase relationship of the output voltage of the VSCF generator 40 and the voltage of the parallel source of electrical power 32.

A circuit breaker or contactor (not shown) connects the generator stator armature windings 49 of the VSCF generator 40 to the parallel source of electrical power 32

In an example of a method for controlling the power output from a VSCF generator 40 of the present invention operating in parallel with the AC mains of electric utility lines or other synchronous generators in a Wind Energy Conversion System (WECS):

An electric power transducer (not shown) monitors the power output from the VSCF generator 40.

A tachometer or other speed sensor (not shown) monitors the rotational velocity of the generator power input shaft 31.

A microprocessor based controller (not shown) determines by computation the amount of power the VSCF generator 40 is required to produce at the particular power input shaft speed determined by the speed sensor.

The microprocessor compares the computed power required to be produced by the generator with the actual power produced as measured by the electric power transducer. The microprocessor then sends an error signal, if any, to the servo amplifier 155 of the servo controlled drive system 50.

The servo controlled drive system 50 rotates the small synchronous motor stator 75, driving the RVCT 89, about the axis of the synchronous motor stator 75 as required to reduce the error signal to zero.

The rotation, relative to the fixed generator stator structure 47 of the synchronous motor stator 75, driving the RVCT 89, changes the power angle or displacement angle of the VSCF generator's magnetic field relative to the armature flux field established in the VSCF generator stator structure by the parallel source of electrical power 32, thus changing the power output of the VSCF generator 40.

The servo controlled drive system 50 continually varies, as needed to maintain the error signal essentially at zero, the angular position of the synchronous motor stator 75 about the axis of the synchronous motor stator 75 relative to the fixed-position generator stator structure 47, thus continually varying, as needed, the power angle and the power output of the VSCF generator 40.

As the wind speed and the WECS wind-turbine speed vary, the closed loop servo controlled drive system 50 varies the power angle and thus the power output of the VSCF generator 40.

If the wind-turbine speed and power increases, the servo controlled drive system 50 increases the power angle and thus the power output of the VSCF generator 40.

If the wind-turbine speed and power decreases, the servo system decreases the power angle and thus the power output of the VSCF generator 40.

From the preceding, it will be understood that the means for controlling the relative electrical angular position, as a function of time, of the VSCF generator 40 electromagnetic field and thus the resultant relative electrical angular position, as a function of time, of the output voltage of the VSCF generator 40, with respect to the electrical angular position, as a function of time, of the voltage of the parallel source of electrical power 32 provides the means for controllably varying the phase difference between the output voltage of the VSCF generator and the voltage of the parallel source of electrical power 32 prior to the parallel connection of the two systems.

Once the output of the VSCF generator 40 has been connected in parallel with the parallel source of electrical power 32, the means for controlling the relationship of the angular position, as a function of time, of the electromagnetic field on the VSCF generator rotor structure 33 with respect to the angular position, as a function of time, of the rotating generator armature flux field determined by the parallel source of electrical power 32 provides the means for controlling the power angle or displacement angle between the electromagnetic field on the generator rotor structure and the armature flux field established in the generator stator structure 47 by the parallel source of electrical power 32.

In operation, the prime mover 34 rotates the generator power input shaft 31 at some speed between the minimum and maximum operating speeds of the system. The generator rotor structure 33, containing main generator rotating polyphase electromagnetic field windings 35, is mounted on and rotates with the generator power input shaft 31. The brushless exciter armature structure 37 containing brushless exciter armature windings 39 is also mounted on and rotates with the generator power input shaft 31 which is supported on bearings 51 and 53. A generator housing 41 supports a stationary brushless exciter field structure 43 containing brushless exciter electromagnetic field windings 45. The generator housing 41 also supports a stationary generator stator structure 47 which contains generator stator armature windings 49.

A 3-phase primary 55 of a 3-phase rotating transformer 59 is mounted on and rotates with the generator power input shaft 31. A 3-phase secondary 57 of the 3-phase rotating transformer 59 is mounted in a rotatable housing 61 which is supported by bearings 63 and 65. The rotatable housing 61 is free to controllably rotate about the axis of the generator power input shaft 31, so that the 3-phase secondary 57 of the 3-phase rotating transformer 59 is free to controllably rotate about the 3-phase primary 55 of the 3-phase rotating transformer 59. Three 1-phase primaries 67A–67C of three rotating variable coupling transformers 71A–71C are mounted in the rotatable housing 61 and are free to rotate about the axis of the generator power input shaft 31 and function as reference members. Three 3-phase secondaries 69A–69C of the three rotating variable coupling transformers 71A–71C are mounted on and rotate with the generator power input shaft 31.

The 1-phase electromagnetic axis of each of the three 1-phase primaries 67A–67C is aligned with the 1-phase electromagnetic axis of each of the other two 1-phase primaries in the set of three 1-phase primaries 67A–67C. The 3-phase electromagnetic axis of each of the three 3-phase secondaries 69A–69C is aligned with the 3-phase electromagnetic axis of each of the other two 3-phase secondaries in the set of three 3-phase secondaries 69A–69C. The result is that the three rotating variable coupling transformers 71A–71C act as one multiphase rotating variable coupling transformer (RVCT) indicated generally at 89.

The synchronous motor rotor 73 of the synchronous motor 77 is mounted on the rotatable housing 61. The synchronous motor stator assembly 75 of the synchronous motor 77 is mounted in a synchronous motor housing 79 which is supported by a bearing 81 and is free to controllably rotate about the axis of the generator power input shaft 31. The drive mechanism 83, attached to the output drive of a servo motor 85, engages the synchronous motor housing 79. The drive mechanism 83 and the servo motor 85 controllably restrain or rotate, as controlled by a servo amplifier 155, the synchronous motor housing 79 and the synchronous motor stator assembly 75 about the axis of the generator power input shaft 31 as required to control the phase relationship of the generated output voltage of the generator with respect to the voltage of the AC mains of parallel source of electrical power 32, or to controllably vary the power angle of the VSCF generator 40 when the output of the VSCF generator 40 is connected to the AC mains the parallel source of electrical power 32.

Rotation of the three 1-phase primaries 67A–67C, i.e., the reference members, at a reference speed about the axis of the rotating generator power input shaft 31 is effected when electric power of the desired AC frequency is applied to the synchronous motor stator assembly 75 causing the synchronous motor rotor 73 to rotate at a desired controlled reference speed about the axis of the rotating generator power input shaft 31. In turn, the rotatable housing 61, the 3-phase secondary 57 of the 3-phase rotating transformer 59, and the three 1-phase primaries 67A–67C of the RVCT 89 rotate at the reference speed about the axis of the rotating generator power input shaft 31.

A voltage regulator 99 provides controlled variable electric current to the brushless exciter electromagnetic field windings 45 which sets up an electromagnetic field in the brushless exciter field structure 43. The interaction between the electromagnetic field in the brushless exciter field structure 43 and the rotating brushless exciter armature windings 39 generates a 3-phase AC voltage in the brushless exciter armature windings 39. This 3-phase AC voltage is coupled into the 3-phase primary 55 of the 3-phase rotating transformer 59 by means (not shown). The transformer action of the 3-phase primary 55 induces a 3-phase voltage in the 3-phase secondary 57 of the 3-phase rotating transformer 59. One phase of the voltage induced in the 3-phase secondary 57 is coupled into the 1-phase primary 67A of the rotating variable coupling transformer 71A. A second phase of the voltage induced in the 3-phase secondary 57 is coupled into the 1-phase primary 67B of the rotating variable coupling transformer 71B. The third phase of the voltage induced in the 3-phase secondary 57 is coupled into the 1-phase primary 67C of the rotating variable coupling transformer 71C.

The combined 1-phase primaries 67A–67C of the RVCT 89 induce into each of the corresponding 3-phase secondaries 69A–69C, a 3-phase voltage.

The relative magnitude of each of the phase voltages induced in the combined 3-phase secondaries 69A–69C depends on the alignment of each phase winding of the combined 3-phase secondaries 69A–69C, having an associated shaft orientation, with the combined axis of the 1-phase magnetic field, the reference magnetic field, of the combined 1-phase primaries 67A–67C. The reference orientation of the combined 1-phase primaries 67A–67C, the reference members, relative to the shaft orientation of the combined 3-phase secondaries 69A–69C, the shaft members, determines the relative magnitude of the voltage induced in each of the multiphase windings in the combined 3-phase secondaries 69A–69C. In turn, the relative magnitude of the voltage induced in each of the multiphase windings in the combined 3-phase secondaries 69A–69C can be used to determine the relative position of the reference orientation of the 1-phase primaries 67A–67C relative to the shaft orientation of the windings in the 3-phase secondaries 69A–69C.

It should be understood that a change in the relative magnitude of the voltage induced in each of the multiphase windings in the combined 3-phase secondaries 69A–69C, indicating a change in alignment of the windings of the 3-phase secondaries 69A–69C (the shaft members) in relation to the 1-phase primaries 67A–67C (the reference members), represents a change in the relative angular position of the shaft member 3-phase secondaries 69A–69C with respect to the position of the reference member 1-phase primaries 67A–67C.

The combined circuitry of the main rotating polyphase electromagnetic field windings 35, the rotating rectifier assembly 87, and the 3-phase secondaries 69A–69C of the RVCT 89 is arranged in such a manner that the alignment or orientation of the electromagnetic field in the generator rotor structure 33 with respect to the generator rotor structure 33 is essentially always the same as the alignment or orientation of the combined axis of the three 1-phase primaries 67A–67C with respect to the three combined 3-phase secondaries 69A–69C of the RVCT 89.

In an exemplary apparatus of FIG. 3 for the operation of a 4-pole generator to generate 60 HZ AC (1800 RPM synchronous speed), the synchronous motor stator assembly 75 of the synchronous motor 77 is energized with 60 HZ AC power to drive the synchronous motor rotor 73 at 1800 RPM. As a consequence, the rotatable housing 61 and the attached three 1-phase primaries 67A–67C of the three rotating variable coupling transformers 71A–71C of the combined multiphase rotating variable coupling transformer 89 rotate at 1800 RPM.

In an example when the generator power input shaft 31 and the attached generator rotor structure 33 and the attached three 3-phase secondaries 69A–69C are rotating at 1790 RPM, the three 1-phase primaries 67A–67C, rotating at exactly 1800 RPM, are moving forward at 10 RPM with respect to the three 3-phase secondaries 69A–69C rotating at 1790 RPM.

When the three 1-phase primaries 67A–67C, rotating at exactly 1800 RPM, are moving forward at 10 RPM with respect to the three 3-phase secondaries 69A–69C rotating at 1790 RPM, the field winding electric currents induced in the main generator rotating polyphase electromagnetic field windings 35 by the combined circuitry of the main generator rotating polyphase electromagnetic field windings 35, the rotating rectifier assembly 87, and the 3-phase secondaries 69A–69C cause the position of the rotating electromagnetic field in the generator rotor structure 33 relative to the generator rotor structure 33 to essentially continuously be the same as the position of the reference primaries 67A–67C relative to the 3-phase secondaries 69A–69C and to thus move forward at 10 RPM relative to the generator rotor structure 33 rotating at 1790 RPM.

The result is that the rotating electromagnetic field of the generator continues to rotate at 1800 (1790+10) RPM relative to a fixed point in space, and the frequency of the generated AC power from the generator remains at exactly 60 HZ.

In an example when the generator power input shaft 31 and the attached generator rotor structure 33 and the attached three 3-phase secondaries 69A–69C are rotating at 1810 RPM, the three 1-phase primaries 67A–67C, rotating at exactly 1800 RPM, are moving backward at 10 RPM with respect to the three 3-phase secondaries 69A–69C rotating at 1810 RPM.

When the three 1-phase primaries 67A–67C, rotating at exactly 1800 RPM, are moving backward at 10 RPM with respect to the three 3-phase secondaries 69A–69C rotating at 1810 RPM, the field winding electric currents induced in the main generator rotating polyphase electromagnetic field windings 35 by the combined circuitry of the main generator rotating polyphase electromagnetic field windings 35, the rotating rectifier assembly 87, and the 3-phase secondaries 69A–69C cause the electromagnetic field in the generator rotor structure 33 to move backward at 10 RPM relative to the generator rotor structure 33 rotating at 1810 RPM.

The result is that the electromagnetic field of the generator continues to rotate at 1800 (1810−10) RPM relative to a fixed point in space, and the frequency of the generated AC power from the generator remains at exactly 60 HZ. Similar corrective action takes place whenever the rotational speed of the generator power input shaft 31 and the attached generator rotor structure 33 and the attached three 3-phase secondaries 69A–69C differs from the reference speed of the three 1-phase primaries 67A–67C of the RVCT89.

As a result, the electromagnetic field induced in the generator rotor structure 33 rotates about the axis of the generator power input shaft 31 with respect to a fixed point in space, such as the generator stator structure 47, at the same rotational speed as that of the three 1-phase primaries 67A–67C of the RVCT 89 with respect to the same fixed point in space such as the generator stator structure 47.

The interaction between the rotating electromagnetic field established in the generator rotor structure 33 and the stationary generator stator armature windings 49 generates a voltage in the generator stator armature windings 49. This voltage is the generated output voltage of the generator. The voltage regulator 99 monitors the generated output voltage and varies the excitation current to the brushless exciter electromagnetic field windings 45 as required to maintain the generated output voltage from the generator stator armature windings 49 at a predetermined value.

The servo controlled drive system 50 rotates the synchronous motor housing 79 and the synchronous motor stator assembly 75 of the synchronous motor 77 about the axis of the synchronous motor 77 as required to alter the phase relationship between the output voltage of the generator of this invention and the voltage of the parallel source of electrical power 32 prior to the connection of the output electrical power 42 of the VSCF generator 40 to the AC mains of the parallel source of electrical power 32.

Once the generated output of the VSCF generator 40 of this invention is connected to the parallel source of electrical power 32, the servo controlled drive system 50 rotates the synchronous motor housing 79 and the synchronous motor stator assembly 75 of the synchronous motor 77 about the axis of the synchronous motor 77 as required to alter the power angle and thus the power output of the VSCF generator 40 of this invention connected to the parallel source of electrical power 32.

Considering now the power flow of the VSCF generator 40 of the present invention in greater detail with reference to FIG. 4, there is shown a flow diagram of both mechanical and electrical energy. The generator power input shaft 31 is physically connected to the brushless exciter armature structure 37, the generator rotor structure 33, the rotating 3-phase primary 55, and the RVCT 3-phase secondaries 69A–69C, and provides a mechanical power input to the VSCF generator 40 in the form of rotational energy. In this way, a rotational force is applied to the brushless exciter armature structure 37, the generator rotor structure 33, the 3-phase primary 55, and the 3-phase secondaries 69A–69C. The symbol M in FIG. 4 denotes mechanical energy.

The electric current supplied to the brushless exciter electromagnetic field windings 45 from the voltage regulator 99 creates an electromagnetic field in the brushless exciter field structure 43. This electromagnetic field induces a 3-phase voltage in the brushless exciter armature windings 39 which is then applied to the rotating 3-phase primary 55. Transformer action induces a 3-phase voltage in the rotating 3-phase secondary 57. A separate 1-phase of the 3-phase voltage induced in the rotating 3-phase secondary 57 is supplied to each of the 1-phase primaries 67A–67C of RVCT 89.

The 1-phase voltages supplied to the 1-phase primaries 67A–67C induce a corresponding 3-phase voltages in the 3-phase secondaries 69A–69C of RVCT 89. The corresponding AC electric currents induced in the 3-phase secondaries 69A–69C are rectified into DC electric currents by the rotating rectifier 87 and then supplied to the main generator rotating polyphase electromagnetic field windings 35, establishing an electromagnetic field in the generator rotor structure 33. The symbol E in FIG. 4 denotes electrical energy flow.

The interaction of the rotating electromagnetic field in the generator structure 33 and the generator stator armature windings 49 generates an output voltage 42 that is monitored by the voltage regulator 99. The voltage regulator 99 varies the electric current supplied to the brushless exciter electromagnetic field windings 45 to maintain the generated output voltage at a predetermined value.

Figure 5:
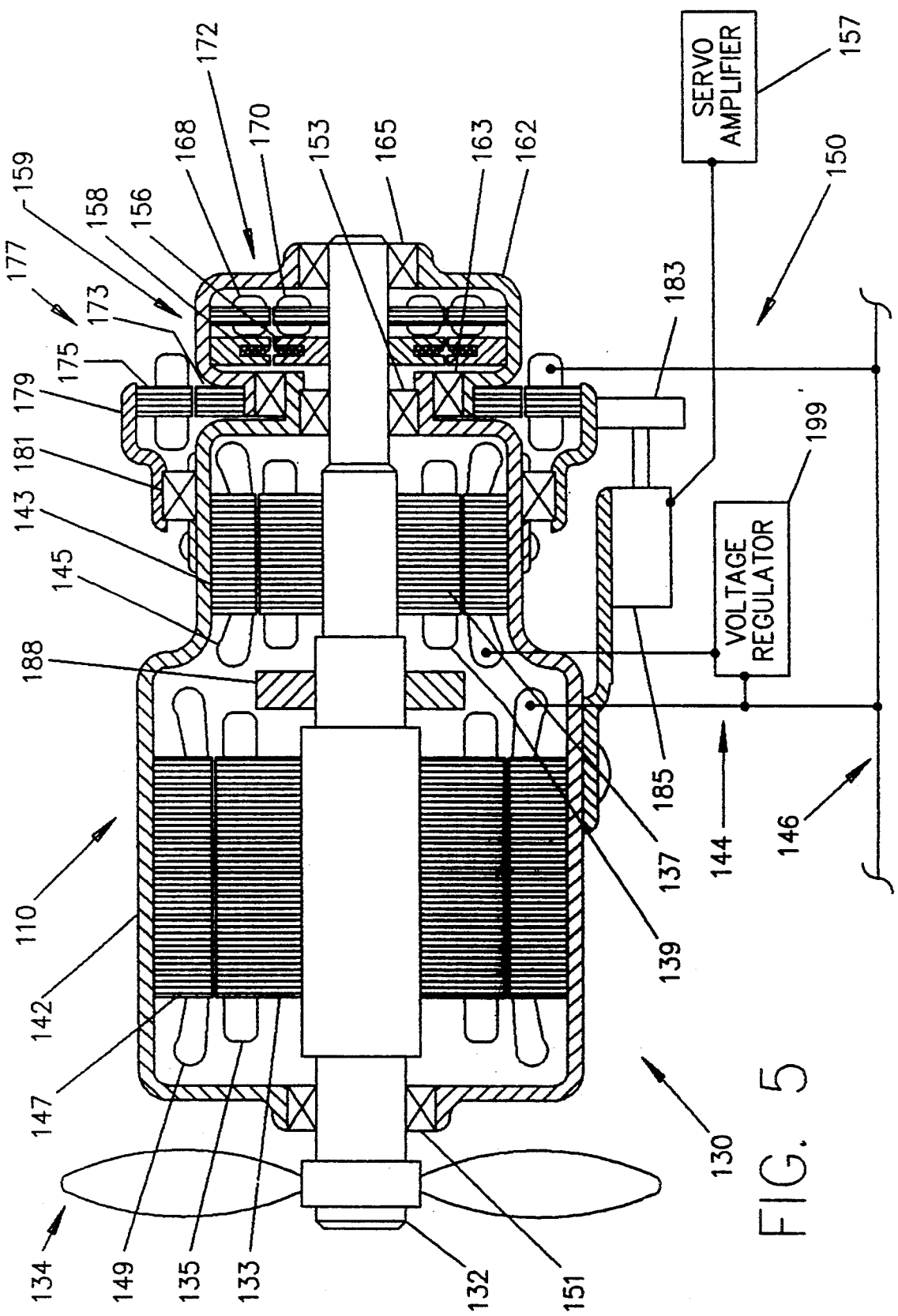
FIG. 5 is a diagrammatic sectional view of another variable speed constant frequency power generating system which is constructed in accordance with the present invention.
Figure 6:
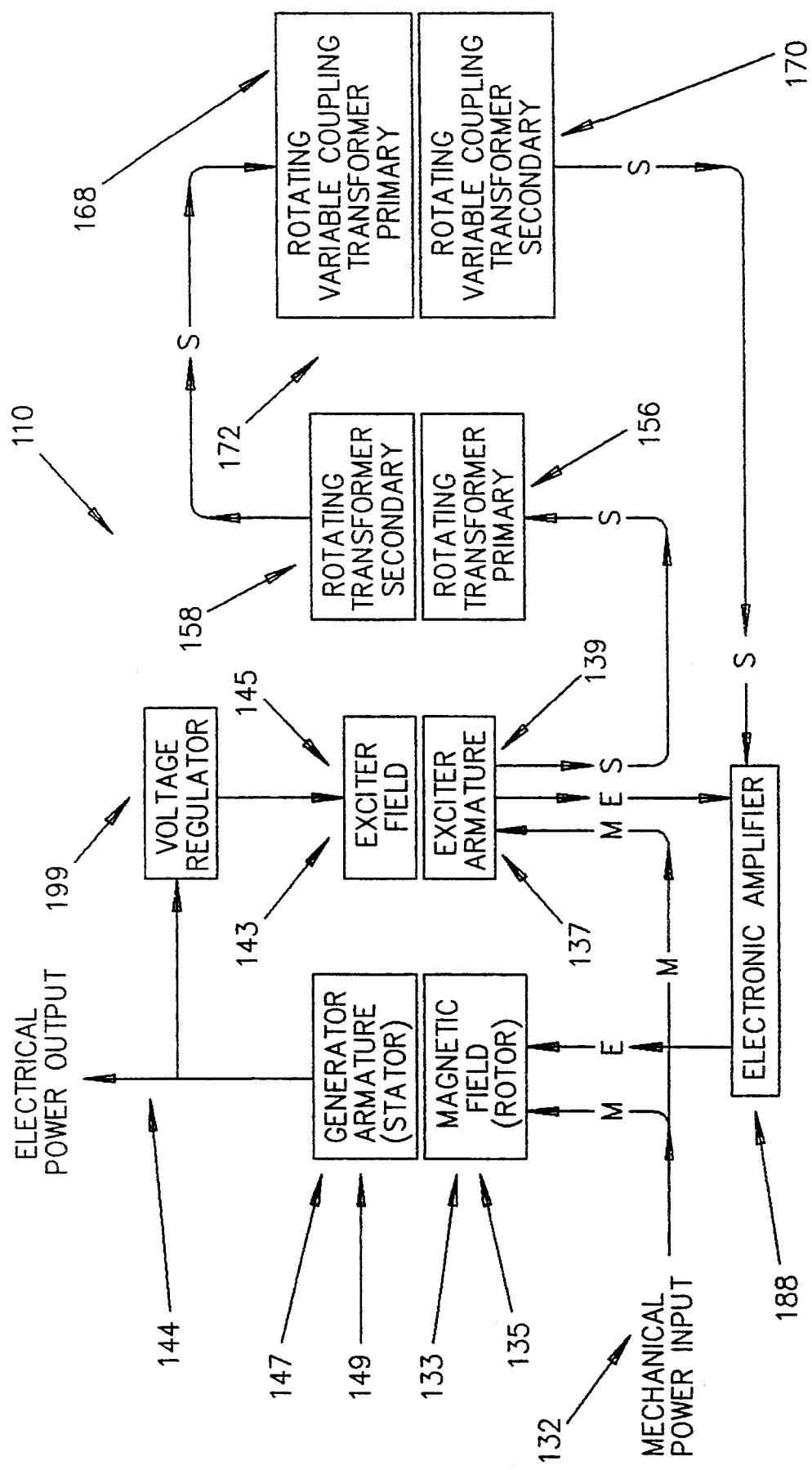
FIG. 6 is a flow diagram showing the flow of mechanical and electrical power and the flow of signals of the variable speed constant frequency power generating system of FIG. 5.

Referring now to FIGS. 5 and 6, there is shown a variable speed constant frequency control arrangement 130 which is constructed in accordance to the present invention. The control arrangement 130 includes a VSCF generator 110 and synchronous motor 177. This arrangement 130 is similar to the electrical power generating system 30 (FIG. 3) except for the VSCF generator 110.

Considering now the VSCF generator 110 in greater detail, the generator is substantially similar to the VSCF generator 40 (FIG. 3) except that it includes only one RVCT reference member or 1-phase primary 168, as opposed to three reference 1-phase primaries 67A–67C as in the VSCF generator 40 (FIG. 3), and only one shaft member 3-phase secondary 170 as opposed to three shaft member 3-phase secondaries 69A–69C as in the VSCF generator 40 (FIG. 3).

The VSCF generator 110 is coupled to a rotatable variable-coupling transformer (RVCT) 172 having a rotatable reference member or 1-phase primary unit 168 which is rotated by the synchronous motor 177 at a reference speed, and a shaft member or 3-phase secondary 170 coupled to a power input shaft 132 which rotates at a generator rotor shaft speed. The 3-phase secondary 170 corresponds to the reference member 1-phase primary 168 in such a way that the reference member 1-phase primary 168 rotates coaxially about the associated shaft member 3-phase secondary 170.

A rotating 1-phase transformer 159 is disposed between brushless exciter armature windings 139 in a brushless exciter armature structure 137 and the 1-phase primary 168 to supply one phase of alternating current from the output of the brushless exciter armature windings 139 to the 1-phase primary 168.

Considering now the VSCF generator 110 in still greater detail, RVCT 172 serves as a sensor and not as a means for directly variably coupling the source of the electromagnetic excitation power to the electromagnetic field windings of the VSCF generator rotor structure 133 of the present invention. In this regard, an electronic power amplifier 188 is interposed between the source of the electromagnetic excitation power and the electromagnetic field windings 135 of the VSCF generator rotor structure 133.

The RVCT 172 is a small, signal-level low power version of the large, high power RVCT 89 (FIG. 3) of the preferred form of the present invention, serving only to transmit a signal indicating the position of the 1-phase primary 168 relative to the position of the 3-phase secondary 170.

The operation of the RVCT 172 is similar to that of the previously described RVCT 89 (FIG. 3). The relative magnitudes of the three AC voltages induced in the three phases of the 3-phase secondary 170 are indicative of the angular orientation of the 1-phase primary 168 with respect to the 3-phase secondary 170. The electric windings of the 3-phase secondary 172 are connected to the electronic power amplifier 188.

The electronic power amplifier 188 amplifies the signal from each of the three windings of the 3-phase secondary 170. The output of the electronic power amplifier 188 is connected to the rotating polyphase electromagnetic field windings 135 in the VSCF generator rotor structure 133 in such an arrangement that the orientation or alignment of the electromagnetic field in the VSCF generator rotor structure 133 relative to the VSCF generator rotor structure 133 essentially exactly duplicates the orientation of the 1-phase primary 168 relative to the 3-phase secondary 170.

The end result of the action of the RVCT 172 and the electronic power amplifier 188 is essentially the same as that of the previously discussed preferred form of this invention. Only the means have changed to accomplish the same end result. That is, the position of the electromagnetic field of the VSCF generator 110 relative to the VSCF generator rotor structure 133 is the same as the position of the 1-phase primary 168 relative to the 3-phase secondary 170. As a consequence, the rotational velocity of the electromagnetic field of the VSCF generator 110 with respect to a fixed point in space such as the fixed VSCF generator stator structure 147 is essentially always exactly the same as the rotational velocity of the 1-phase primary 168 with respect to the same fixed point in space such as the fixed VSCF generator stator structure 147.

Rotation of the synchronous motor stator 175 driving the 1-phase primary 168 provides the same control of the phase relationship of the output voltage, the power angle and the power output of the VSCF generator 110 form as previously described relative to the preferred VSCF generator 10 form of the invention.

The first alternate form substitutes a relatively smaller RVCT and an electronic amplifier for the relatively larger high-power and heavier RVCT of the preferred form of the present invention.

The key to the successful operation of this first alternate form of the invention is the arrangement whereby the position of the VSCF generator electromagnetic field relative to the mechanical structure of the VSCF generator rotor structure 133 is made to essentially always duplicate the position of a reference apparatus or member, rotating at a reference speed, relative to the mechanical structure of the rotor of the VSCF generator rotor structure 133. As a consequence, the rotational speed of the VSCF generator electromagnetic field with respect to a fixed point in space such as the generator stator armature windings 149 of the VSCF generator 110 is the same as the rotational speed of the reference or 1-phase primary unit of the reference member relative to the same point in space.

In the first alternate form, the 1-phase primary 168 of the RVCT 172 is the reference member rotating at a reference speed. The 3-phase secondary 170 of the RVCT 172 is firmly attached to the same generator power input shaft as is the rotor of the VSCF generator and thus can be considered an extension of the mechanical structure of the rotor of the VSCF generator.

Rotation of the synchronous motor stator 175 about its own axis provides the same control of the electrical angular position, as a function of time, relationship of the generated output voltage of the VSCF generator 110, and the same control of the power angle of the VSCF generator 110, as did the rotation of the synchronous motor stator 75 (FIG. 3) for the generator 10 (FIG. 3) in the preferred form of the invention.

In operation, a prime mover 134 rotates the power input shaft 132 at some speed between the minimum and maximum operating speeds of the system. A generator rotor structure 133, containing rotating polyphase electromagnetic field windings 135, is mounted on and rotates with the power input shaft 132. The brushless exciter armature structure 137 contains a brushless exciter armature windings 139 and is mounted on the power input shaft 132 which is supported on bearings 151 and 153. A generator housing 142 supports a stationary brushless exciter field structure 143 containing brushless exciter electromagnetic field windings 145. The generator housing 142 also supports a stationary generator stator structure 147 which contains generator stator armature windings 149.

A 1-phase primary 156 of a 1-phase rotating transformer 159 is mounted on and rotates with the power input shaft 132. A rotating transformer 1-phase secondary 158 of the 1-phase rotating transformer 159 is mounted in a rotatable housing 162 which is supported by bearings 163 and 165. The rotatable housing 162 is free to controllably rotate about the axis of the power input shaft 132, so that the rotating transformer 1-phase secondary 158 of the 1-phase rotating transformer 159 is free to controllably rotate about the 1-phase primary 156 of the 1-phase rotating transformer 159. A 1-phase primary 168 of a rotating variable coupling transformer (RVCT) 172 is mounted in the rotatable housing 162 and is free to rotate about the axis of the power input shaft 132 and functions as a reference member. A 3-phase secondary 170 of the rotating variable coupling transformer 172 is mounted on and rotates with the power input shaft 132 and functions as a shaft member whose rotational speed can be compared to the rotational speed of the reference member.

A synchronous motor rotor 173 of a synchronous motor 177 is mounted on rotatable housing 162. A synchronous motor stator assembly 175 of the synchronous motor 177 is mounted in a synchronous motor housing 179 which is supported by a bearing 181 and is free to controllably rotate about the axis of the power input shaft 132. A drive mechanism 183, attached to the output drive of a servo motor 185, engages the synchronous motor housing 179. The drive mechanism 183 and the servo motor 185, as controlled by a servo amplifier 157 of a servo control system 150, controllably restrain or rotate the synchronous motor housing 179 and the synchronous motor stator assembly 175 about the axis of the synchronous motor housing 179 as required to control the phase relationship of the generated output voltage 144 of the VSCF generator 110 of this invention with respect to the voltage of the AC mains of a parallel source of electrical power 146, or to controllably vary the power angle of the generator of this invention when the generator of this invention is connected to the AC mains of the parallel source of electrical power 146.

Rotation of the 1-phase primary 168, i.e., the reference member, at a reference speed is effected when electric power of the desired AC frequency is applied to the synchronous motor stator assembly 175 causing the synchronous motor rotor 173 to rotate at a desired controlled reference speed about the axis of the rotating power input shaft 132. In turn, the rotatable housing 162, the rotating transformer 1-phase secondary 158 of the 1-phase rotating transformer 159, and the 1-phase primary 168 of the rotating variable coupling transformer (RVCT) 172 rotate at the reference speed about the axis of the rotating power input shaft 132.

A voltage regulator 199 provides controlled variable electric current to the brushless exciter electromagnetic field windings 168 which sets up an electromagnetic field in the brushless exciter field structure 143. The interaction between the electromagnetic field in the brushless exciter field structure 143 and the rotating brushless exciter armature windings 139 generates a 3-phase AC power in the brushless exciter armature windings 139. This 3-phase AC power is fed into a rotating electronic amplifier 188 mounted on the generator power input shaft.

Voltage from one phase of the 3-phase power generated in the brushless exciter armature windings 139 is supplied to a small signal-level low power 1-phase primary 156 of the 1-phase rotating transformer 159. This small signal-level power is transferred to the rotating transformer 1-phase secondary 158 of the 1-phase rotating transformer 159 by transformer action from the 1-phase primary 156 and then is conducted to the 1-phase primary 168 of the RVCT 172.

The 1-phase primary 168 induces a 3-phase voltage in the 3-phase secondary 170 of the RVCT 172.

The relative magnitude of each of the three phase voltages induced in the 3-phase secondary 170 depends on the angular alignment of each phase winding of the 3-phase secondary 170 the axis of the 1-phase magnetic field of the single-phase primary 168. The reference angular orientation of the single-phase primary 168, the reference member, relative to the 3-phase secondary 170, the shaft member, determines the relative magnitude of the voltage induced in each of the three phase windings in the 3-phase secondary 170. In turn, the relative magnitude of the voltage induced in each of the three phase windings in the 3-phase secondary 170 is indicative of the relative angular position of the reference orientation of the 1-phase primary 168 relative to the orientation of the windings in the 3-phase secondary 170.

The three individual phase voltages from the 3-phase secondary 170 are conducted to the rotating electronic amplifier 188 as reference signals indicating the varying relative magnitude of the voltage induced in each of the three phase windings in the 3-phase secondary 170 and thus indicating the angular alignment of the 1-phase primary 168 relative to the windings in the 3-phase secondary 170 of the RVCT 172. The rotating electronic amplifier 188 amplifies the three signal-level voltages from the 3-phase secondary 170 of the rotating variable coupling transformer 172 to the power level required to provide the full electromagnetic excitation required to provide full output voltage and power from the VSCF generator 110. The rotating electronic amplifier 188 proportionally maintains the same relative magnitude between the three phase voltages of its output as the relative magnitude between the three signal-level input voltages from the rotating variable coupling transformer 172. As a result, the output voltages from the rotating electronic amplifier 188 develop field winding electric currents in the generator rotating polyphase electromagnetic field windings 135 that set up the electromagnetic field in the generator rotor structure 133. The angular orientation of this electromagnetic field relative to the generator rotor structure 133 is essentially the same as the alignment of the reference orientation of the single-phase primary 168 relative to the 3-phase secondary 170.

In an exemplary apparatus of FIG. 5 for the operation of a 4-pole generator to generate 60 HZ AC (1800 RPM synchronous speed), the synchronous motor stator assembly 175 of the synchronous motor 177 is energized with 60 HZ AC power to drive the synchronous motor rotor 173 at 1800 RPM. As a consequence, the rotatable housing 162 and the attached 1-phase primary 168 of the RVCT 172 rotate at 1800 RPM.

In an example when the power input shaft 132 and the attached generator rotor structure 133 and the attached 3-phase secondary 170 are rotating at 1790 RPM, the single-phase primary 168, rotating at exactly 1800 RPM, is moving forward at 10 RPM with respect to the 3-phase secondary 170 rotating at 1790 RPM.

When the 1-phase primary 168, rotating at exactly 1800 RPM, is moving forward at 10 RPM with respect to the 3-phase secondary 170 rotating at 1790 RPM, the field winding electric currents developed in the generator electromagnetic field windings 135 by the rotating electronic amplifier 188 in response to the varying electrical signal levels from the 3-phase secondary 170 cause the electromagnetic field in the generator rotor structure 133 to move forward at 10 RPM relative to the generator rotor structure 133 rotating at 1790 RPM.

The result is that the rotating electromagnetic field of the generator continues to rotate at 1800 (1790+10) RPM relative to a fixed point in space, and the frequency of the generated AC power from the generator remains at exactly 60 HZ. Similar corrective action takes place whenever the rotational speed of the power input shaft 132 and the attached generator rotor structure 133 and the attached 3-phase secondary 170 differs from the reference speed of the 1-phase primary 168.

As a result, the electromagnetic field induced in the generator rotor structure 133 rotates about the axis of the power input shaft 132, with respect to a fixed point in space such as the generator stator structure 147 at the same rotational speed as that of the 1-phase primary 168 of the rotating variable coupling transformer 172 with respect to the same fixed point in space such as the generator stator structure 147.

The rotating electronic amplifier 188 is self-contained, receiving all of its necessary power from the generated output from the brushless exciter armature windings 139.

The operation of the interaction between the rotating electromagnetic field established in the rotating generator rotor structure 133 and the stationary generator stator armature windings 149 of the generator shown in FIG. 5 and the operation of the remote servo amplifier (not shown), the synchronous motor housing 179, the synchronous motor stator assembly 175 and the synchronous motor rotor 173 of the synchronous motor 177 shown in FIG. 5 is the same as that of the corresponding elements shown in FIG. 3.

Considering now the power flow of the VSCF generator 110 of the present invention in greater detail with respect to FIG. 6, there is shown a flow diagram of mechanical, electrical and signal-level electrical energy. The generator power input shaft 132 is physically connected to the brushless exciter armature structure 137, the generator rotor structure 133, the rotating transformer 1-phase primary 156, and the 3-phase secondary 170 of the RVCT 172, and provides a mechanical power input to the VSCF generator 110 in the form of rotational energy. In this way, a rotational force is applied to the brushless exciter armature structure 137, the generator rotor structure 133, the rotating transformer 1-phase primary 156, and the 1-phase secondary 170. The symbol M in FIG. 6 denotes mechanical energy.

The electric current supplied to the brushless exciter field windings 145 from the voltage regulator 199 creates an electromagnetic field in the brushless exciter field structure 143. This electromagnetic field induces a 3-phase voltage in the exciter armature windings 139 which is then supplied to the rotating electronic amplifier 188 while a 1-phase signal-level voltage is supplied to the rotating transformer 1-phase primary 156. Transformer action induces a 1-phase voltage in the rotating transformer secondary 158 which is then conducted to the 1-phase primary 168. The voltage in the 1-phase 1-phase primary 168 induces voltages in each of the three independent phases of the 3-phase secondary 170. The relative magnitude of each of the three voltages in the independent phases of the 3-phase secondary 170 is indicative of the relative angular position of the 1-phase primary 168 with respect to the 3-phase secondary 170. The three voltages are conducted to the electronic amplifier 188 where the three voltages are then amplified. The amplified voltages develop electric currents in the rotating polyphase electromagnetic field windings 135.

The symbol E in FIG. 6 denotes the flow of electrical energy while the symbol S denotes the flow of signal-level electrical energy.

An output voltage 144 is generated in generator stator armature windings 149 of the generator stator structure 147 and is monitored by the voltage regulator 199. The voltage regulator 199 varies the electric current supplied to the brushless exciter field windings 145 to maintain the generated output voltage at a predetermined value.

Figure 7:
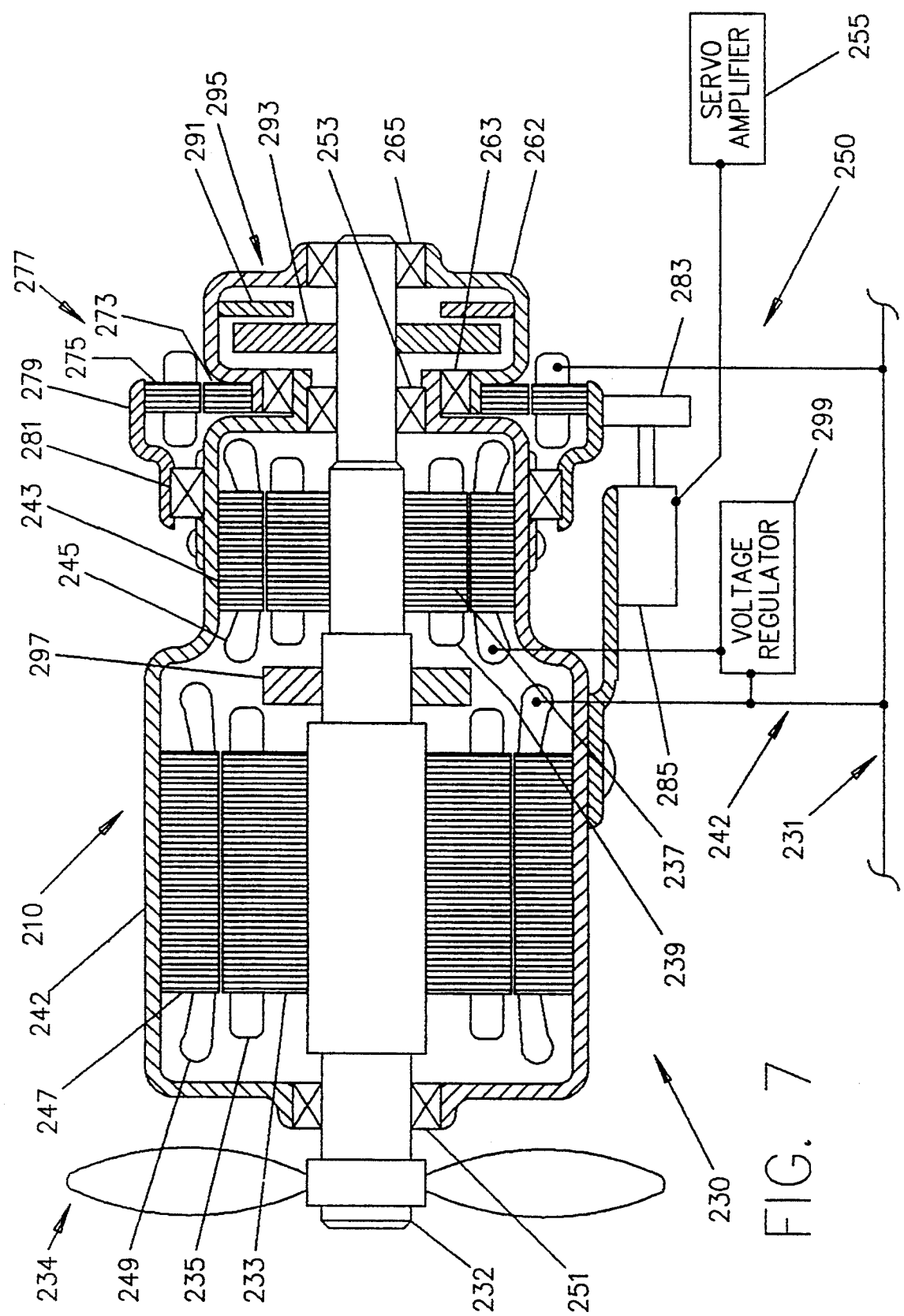
FIG. 7 is a diagrammatic sectional view of a further variable speed constant frequency generating system which is constructed in accordance with the present invention.
Figure 8:
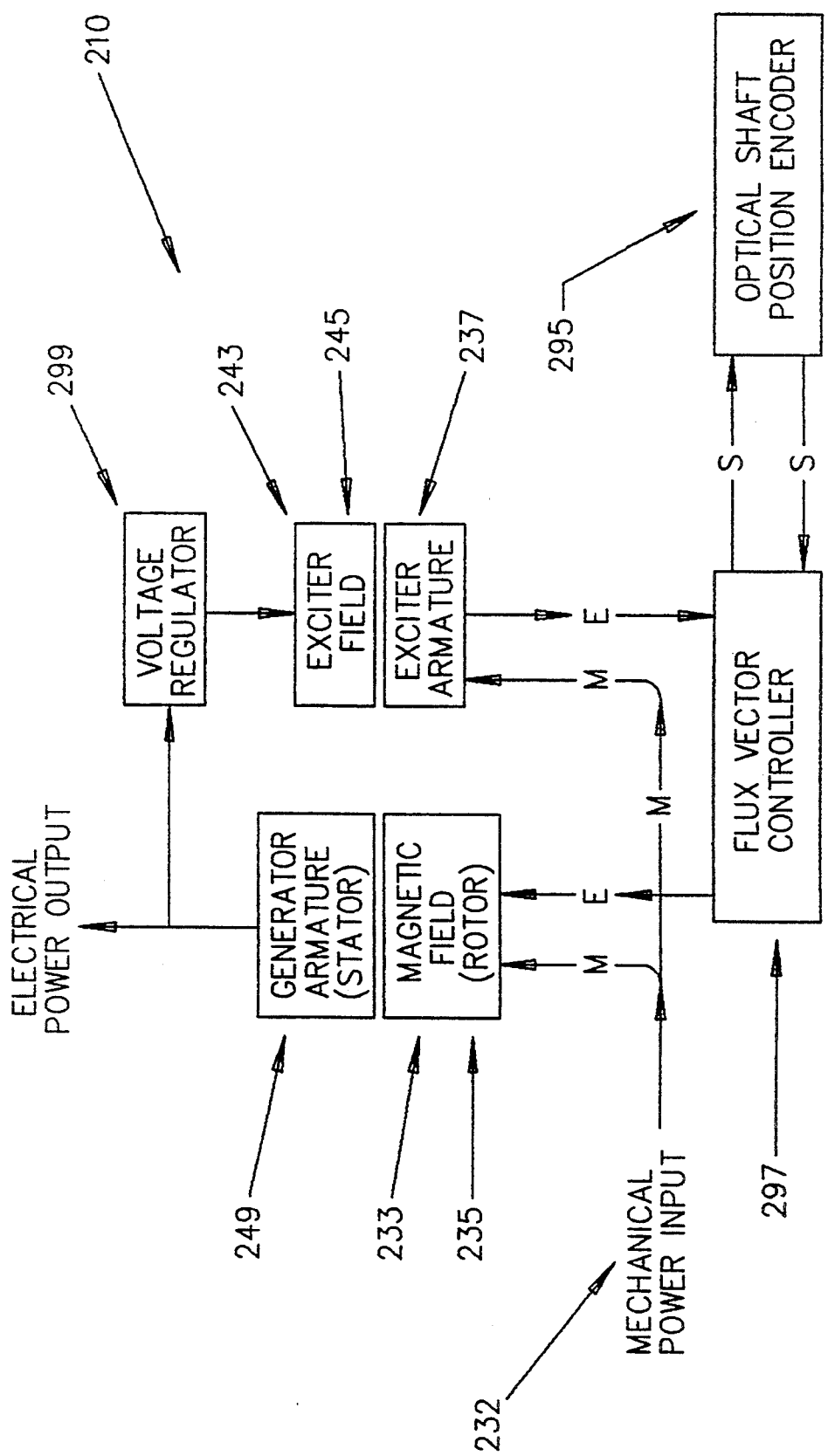
FIG. 8 is a flow diagram showing the flow of mechanical and electrical power and the flow of signals of the variable speed constant frequency generating system of FIG. 7.

Referring now to FIGS. 7 and 8, there is shown a variable speed constant frequency arrangement 230 which is constructed in accordance with the present invention. The arrangement 230 includes a VSCF generator 210 and a synchronous motor 277. The arrangement 230 is similar to the electrical power generating system 130 (FIG. 5) except for the VSCF generator 210.

Considering now the VSCF generator 210 in greater detail, the VSCF generator 210 is similar to VSCF generator 110 (FIG. 5) except that it includes a rotating optical shaft position encoder 295 as opposed to one RVCT 172 (FIG. 5), with one reference first member disc 291, as opposed to one reference member 1-phase primary 168 (FIG. 5), and one shaft member, such as a light source and sensors second member 293, as opposed to one 3-phase secondary 170 (FIG. 5) as in VSCF generator 110.

Additionally, generator 210 includes a rotating electronic flux vector controller 297 secured to a power input shaft 232 to convert digital information into a representative field winding electric current as opposed to the electronic amplifier 188 (FIG. 5) that amplified analog information into a representative field winding electric current in VSCF generator 110.

The optical shaft position encoder 295 is electrically connected to the flux vector controller 297 and includes both the rotating reference first member disc 291 and the light source and sensors second member 293.

The optical shaft position encoder 295 provides digital data describing a relative angular position between the first member disc 291, the reference member, and the sensors second member 293, the shaft member. The flux vector controller 297 processes the digital data describing the relative angular position first member disc 291 relative to the sensors second member 293 and outputs varying electric currents into the rotating polyphase electromagnetic field windings 235 in the generator rotor structure 233, producing an electromagnetic field having an angular orientation relative to the generator rotor structure 233 which is essentially the same as the relative angular position between the reference first member disc 291 and the sensors second member 293.

Considering the generator 210 in greater detail, the generator 210 includes an optical shaft position encoder 295. The optical shaft position encoder 295 can be a modified version of a conventional prior art optical shaft position encoder.

The first member of a conventional prior art optical shaft position encoder consists of either a rotating disc or a rotating cylinder. The rotating disc or cylinder is coated with a light-reflective material in a coded pattern.

The second member of a typical prior art optical shaft position encoder is normally stationary. The stationary second member of the prior art optical shaft position encoder contains one or more light sources and light sensors. The light sensors in the stationary second member of the optical shaft position encoder "read" the coded pattern of the reflective material on the first member rotating disc or rotating cylinder to determine the incremental change in angular position of the first member with respect to the second member of the prior art optical shaft position encoder.

The generator 210 uses a modified version of the prior art optical shaft position encoder described in the preceding paragraph. The normally stationary second member containing the light sources and light sensors of the prior art optical shaft position encoder is modified so that it can be mounted on the VSCF generator power input shaft 232 and can rotate with the power input shaft 232.

The purpose and operational function of the shaft position encoder 295 is essentially the same as that of the RVCT 172 (FIG. 5) described relative to VSCF generator 110.

The sensors second member 293 is firmly attached to the power input shaft 232. The reference first member disc 291, rotating at a reference speed, functions as the reference speed device.

The action of the optical encoder 295 and the rotating flux vector controller 297 causes the angular position of the electromagnetic field of the VSCF generator 210 relative to the mechanical structure of the VSCF generator rotor structure 233 to be a duplicate of the angular position of the reference first member disc 291 relative to the sensors second member 293.

The electronic circuitry of the flux vector controller 297 of the second alternate form of the invention is substantially the same, except for the addition of some logic circuitry, as that of the rotating electronic amplifier 188 (FIG. 5) described relative to VSCF generator 110. The end result is also essentially the same. Only the method whereby the angular orientation of the generator main electromagnetic field relative to the generator structure is determined differs.

With respect to VSCF generator 110, the signals from the RVCT 172 (FIG. 5) directly determine the required relative per unit values and polarities of the three electric currents in the three phases of the rotating polyphase electromagnetic field windings 135 (FIG. 5). Thus, the rotating electronic amplifier 188 merely amplifies the signals from the RVCT 172 (FIG. 5) to the power level required to generate the power required from the VSCF generator 110.

With respect to generator 210, the flux vector controller 297 interprets digital information from the optical shaft position encoder 295 to determine the required relative magnitudes and polarities of the three electric currents in the rotating polyphase electromagnetic field windings 235 of the VSCF generator 210 instead of just amplifying analog signals as the electronic power amplifier 188 (FIG. 5) does in the VSCF generator 110.

In this regard, rotation, around its own axis, of the synchronous motor stator 275 driving the reference first member disc 291 has essentially the same effect and provides the same control of relative voltage phasing and of power angle and power output as did the rotation of the synchronous motor stator 175 (FIG. 5) driving the reference 1-phase primary 168 of the RVCT 172 of VSCF generator 110 (FIG. 5).

In operation, a prime mover 234 rotates the power input shaft 232 at some speed between the minimum and maximum operating speeds of the system. A generator rotor structure 233, containing generator rotating polyphase electromagnetic field windings 235, is mounted on and rotates with the power input shaft 232. The brushless exciter armature structure 237 containing brushless exciter armature windings 239 is also mounted on and rotates with the power input shaft 232 which is supported on bearings 251 and 253. A generator housing 242 supports a stationary brushless exciter field structure 243 containing brushless exciter electromagnetic field windings 245. The generator housing 242 also supports a stationary generator stator structure 247 which contains generator stator armature windings 249.

The light source and sensors second member 293 of the optical shaft position encoder 295 is mounted on and rotates with the power input shaft 232. In this way, the light source and sensors second member 293 acts as a shaft member which rotates about the axis of the power input shaft 232 at the same speed at which the rotor structure 233 rotates about the axis of the power input shaft 232. The rotating disc first member 291 of the optical shaft position encoder 295 is mounted in a rotatable housing 262 which is supported by bearings 263 and 265. The rotatable housing 262 is free to controllably rotate about the axis of the power input shaft 232, so that the rotating disc first member 291 of the optical shaft position encoder 295 is free to controllably rotate with respect to the light source and sensors second member 293 of the optical shaft position encoder 295 and function as a reference member..

A synchronous motor rotor 273 of the synchronous motor 277 is mounted on a rotatable housing 262. A synchronous motor stator assembly 275 of the synchronous motor 277 is mounted in a synchronous motor housing 279 which is supported by a bearing 281 and is free to controllably rotate about the axis of the power input shaft 232. A drive mechanism 283, attached to the output drive of a servo motor 285, engages the synchronous motor housing 279. The drive mechanism 283 and the servo motor 285 controlled by a servo amplifier 255 of a servo drive control system 250 controllably restrain or rotate the synchronous motor housing 279 and the synchronous motor stator assembly 275 about the axis of the power input shaft 232 as required to control the phase relationship of the generated output voltage 242 of the generator with respect to the voltage of the AC mains of separate parallel source of electrical power 231, or to controllably vary the power angle of the generator of this invention when the generated output voltage 242 of the generator of this invention is connected to the AC mains of the parallel source of electrical power 231.

Rotation of the rotating disc first member 291, i.e. the reference member, at a reference speed is effected when electric power of the desired AC frequency is applied to the synchronous motor stator assembly 275 causing the synchronous motor rotor 273 to rotate at a desired controlled reference speed about the axis of the rotating power input shaft 232. In turn, the rotatable housing 262 and the rotating disc first member 291 of the optical shaft position encoder 295 rotate at the reference speed about the axis of the rotating power input shaft 232.

A voltage regulator 299 provides controlled variable electric current to the brushless exciter electromagnetic field windings 245 which sets up an electromagnetic field in the brushless exciter field structure 243. The interaction between the electromagnetic field in the brushless exciter field structure 243 and the rotating brushless exciter armature windings 239 generates a 3-phase AC power in the brushless exciter armature windings 239. This 3-phase AC power is fed into a rotating flux vector controller 297 mounted on the power input shaft 232.

The rotating flux vector controller 297 provides electrical power for the light source and sensors second member 293 of the optical shaft position encoder 295 and in turn receives digital information from the light source and sensors second member 293 of the optical shaft position encoder 295. The flux vector controller 297 functionally decodes at 297A the digital information from the light source and sensors second member 293 of the optical shaft position encoder 295. This decoded information describes the relative angular position of the rotating disc first member 291, the reference member, with respect to the light source and sensors second member 293, the shaft member, of the optical shaft position encoder 295.

The electronic circuitry of the flux vector controller 297 determines, by computation, the appropriate relative magnitudes and polarities required for each circuit of the rotating polyphase electromagnetic field windings 235 so that the relative angular position of the rotor electromagnetic field with respect to the generator rotor structure 233 can be adjusted to be essentially the same as that of the rotating disc first member 291 with respect to the light source and sensors second member 293 of the optical shaft position encoder 295. As a consequence, the rotational speed associated with the electromagnetic field in the generator rotor structure 233 relative to a fixed point in space such as the generator stator structure 247 is essentially the same as the reference speed of the reference first member disc 291 with respect to the same fixed point in space such as the generator stator structure 247.

Figure 9:
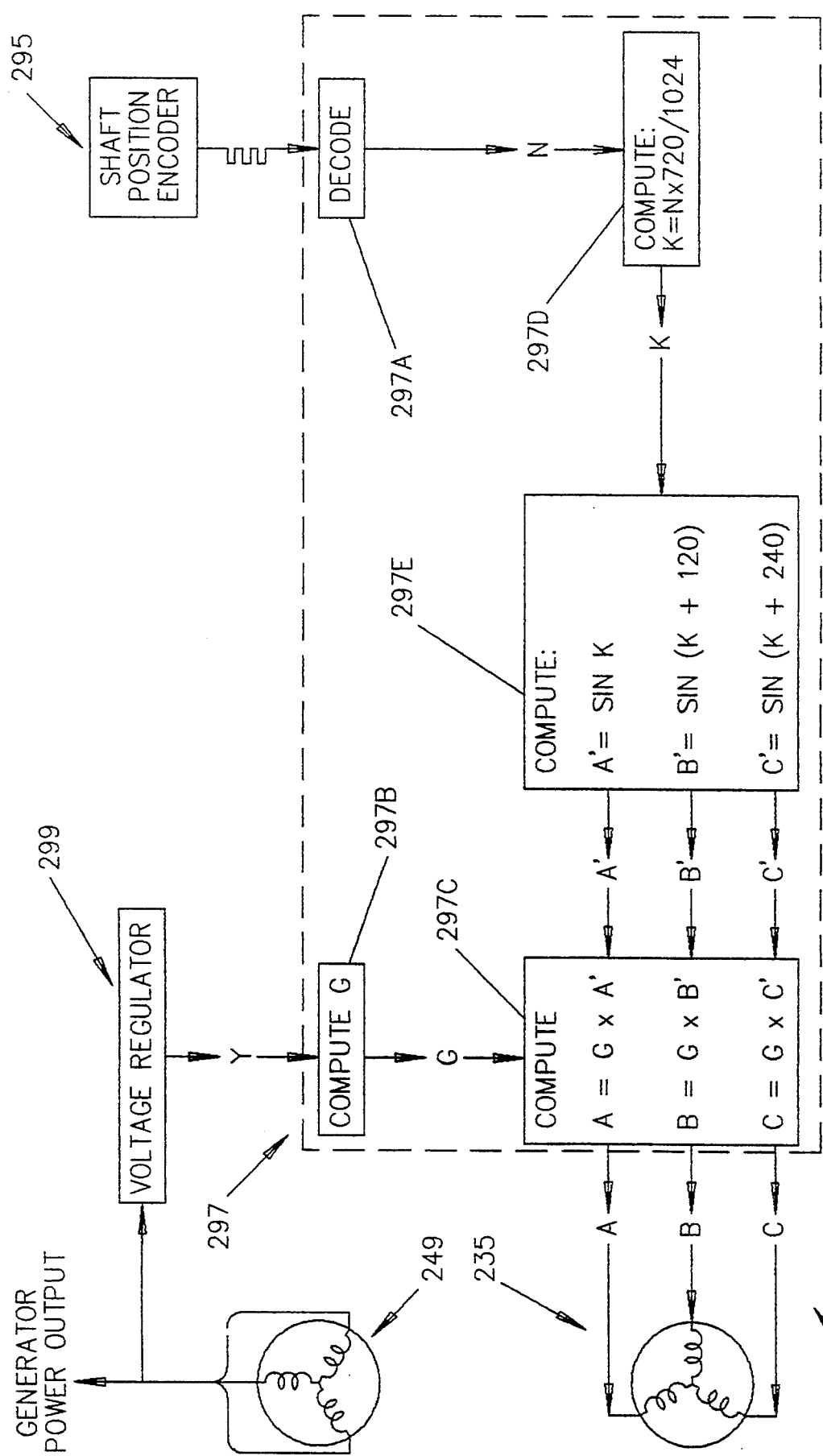
FIG. 9 is a flow diagram showing the flow of electronic logic and computation in the variable speed constant frequency generating system of FIG. 7.

As best seen in FIG. 9, the output from the voltage regulator 299 is utilized to functionally compute G at 297B. The computed function G is functionally multiplied by a set of variables A', B', and C' respectively at 297C to compute the variables A, B and C which are indicative of the required three electric currents in the rotating polyphase electromagnetic field winding 235.

The decoded output from the shaft position encoder 295 is utilized at 297D to compute K. The computed K is utilized functionally at 297E to compute the variables A', B', and C'.

The voltage regulator 299, by its action on the brushless exciter electromagnetic field windings 245 and thus on the actual magnitude of the power output from the brushless exciter armature windings 239, determines the actual absolute magnitude of the electromagnetic field in the generator rotor structure 233 and thus the voltage level and the magnitude of the generated power output from the VSCF generator 210 of this invention.

The flux vector controller 297 is self-contained, receiving all of its necessary power from the generated output from the brushless exciter armature windings 239.

The operation of the interaction between the electromagnetic field established in the rotating generator rotor structure 233 and the stationary generator stator armature windings 249 of the generator 210 and the operation of the servo drive control system 250 consisting of the servo amplifier 255, the synchronous motor housing 279, the synchronous motor stator assembly 275 and the synchronous motor rotor 273 of the synchronous motor 277 is the same as that of the corresponding elements shown in FIG. 3 and FIG. 5.

Considering now the power flow of the generator 210 of the present invention in greater detail with respect to FIG. 8, there is shown a flow diagram of mechanical and electrical power. An input shaft 232 is physically connected to the brushless exciter armature 237 and the generator rotor structure 233, and provides a mechanical power input to the VSCF generator 210 in the form of rotational energy. In this way, a rotational force is applied to the armature 237 and the rotor 233. The symbol M in FIG. 8 denotes mechanical energy.

The electrical current supplied to the brushless exciter field windings 245 from the voltage regulator 299 creates an electromagnetic field in the brushless exciter field structure 243. This electromagnetic field induces a 3-phase voltage in the brushless exciter armature windings 237 which is then supplied to the flux vector controller 297. The flux vector controller 297 provides a signal-level voltage to the optical shaft position encoder 295 and then receives a digital signal from the encoder 295 which the flux vector controller 297 decodes. The flux vector controller 297 then produces the appropriate field winding electric currents for the rotating polyphase electromagnetic field windings 235 to establish the appropriate electromagnetic field in the generator rotor structure 233. The symbol E in FIG. 8 denotes the flow of electrical energy, while the symbol S denotes the flow of signal-level electrical energy.

An output voltage is generated in the generator stator armature windings 249 and is monitored by the voltage regulator 299. The voltage regulator 299 varies the electric current supplied to the brushless exciter field windings 245 to maintain the generated output voltage at a predetermined value.

FIG. 9 shows the flow of electrical signals in the flux vector controller 297 of the generator 210 embodiment shown in FIG. 7 and described in the preceding description. The optical shaft position encoder 295 sends digital information to the flux vector controller 297. The flux vector controller 297 first decodes the digital information to derive a number N. The number N is used in a computation to derive a per unit value for each of the three phase currents for the generator electromagnetic field windings 235.

In the VSCF generator 210 of the present invention shown in FIG. 7, the optical shaft position encoder 295 outputs 1024 bits of information for each 360 degrees of mechanical rotation. The VSCF generator 210 is a 4-pole generator, so there are 720 electrical degrees for each 360 mechanical degrees in one full revolution of the optical shaft position encoder 295.

The per unit value of current A' for phase A of the generator electromagnetic field windings 235 is equal to (sin (720/1024×N)), per unit current B' for phase B is equal to (sin (720/1024×N+120)), and per unit current C' for phase C is equal to (sin (720/1024×N+240)).

The voltage regulator 299 measures the output voltage from the generator stator armature windings 249 and sends a signal Y to the flux vector controller 297. The flux vector controller 297 compares the output voltage level signal Y to a reference or desired voltage level and derives a required gain factor G. The gain factor G determines the actual absolute magnitude of the field winding electric current supplied to each of the three phases of the generator electromagnetic field windings 235. Thus, the electrical current for phase A of the rotating polyphase electromagnetic field windings is equal to (G×[sin (720/1024×N)]), for phase B it is equal to (G×[sin (720/1024×N+120)]), and for phase C it is equal to (G×[sin (720/1024×N+240)]). The voltage regulator 299, the flux vector controller 297, the generator electromagnetic field windings 235, and the generator stator armature windings 249 maintain the output voltage of the VSCF generator 210 at a predetermined value.

Figure 10:
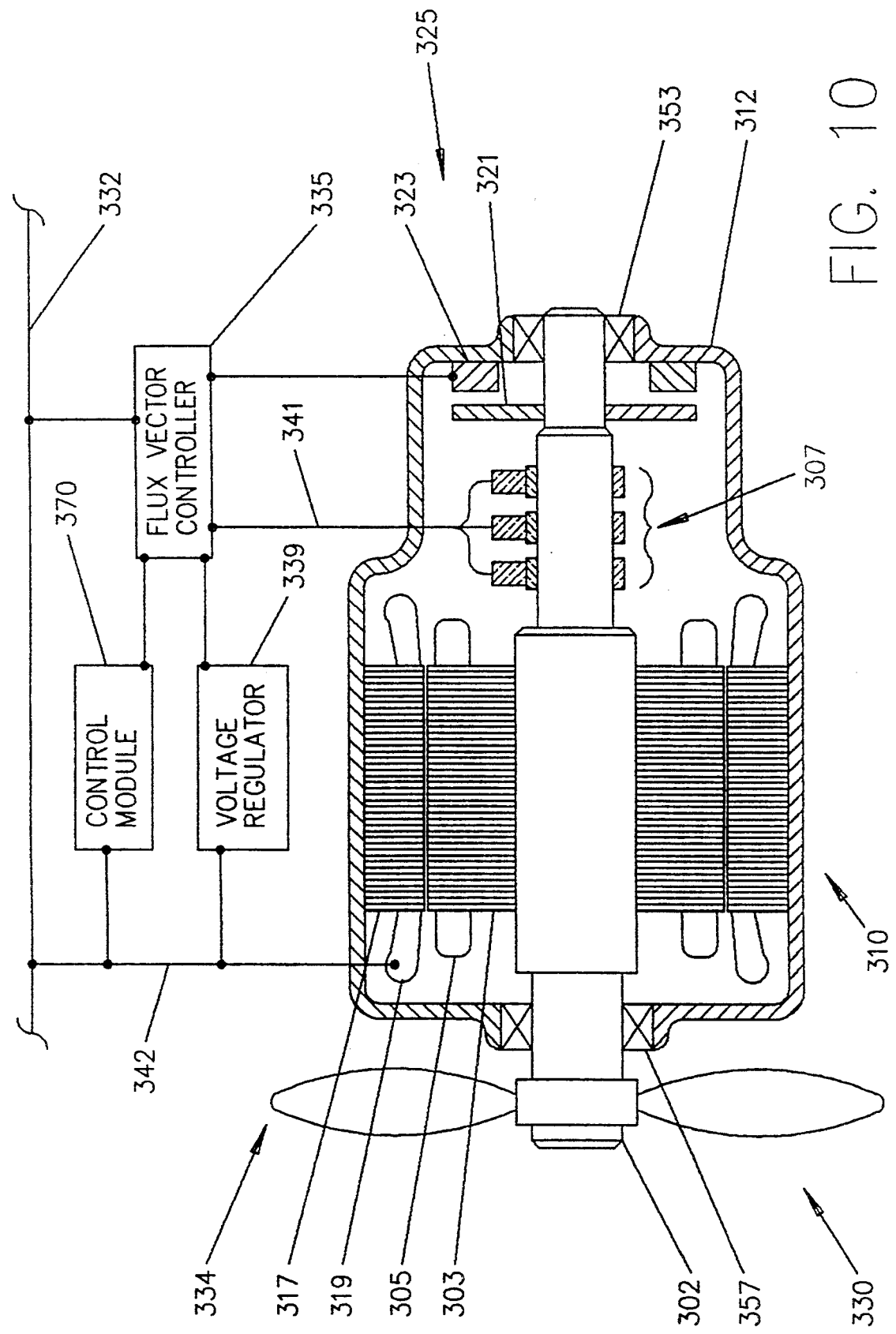
FIG. 10 is a diagrammatic sectional view of yet another variable speed constant frequency generating system which is constructed in accordance with the present invention.
Figure 11:
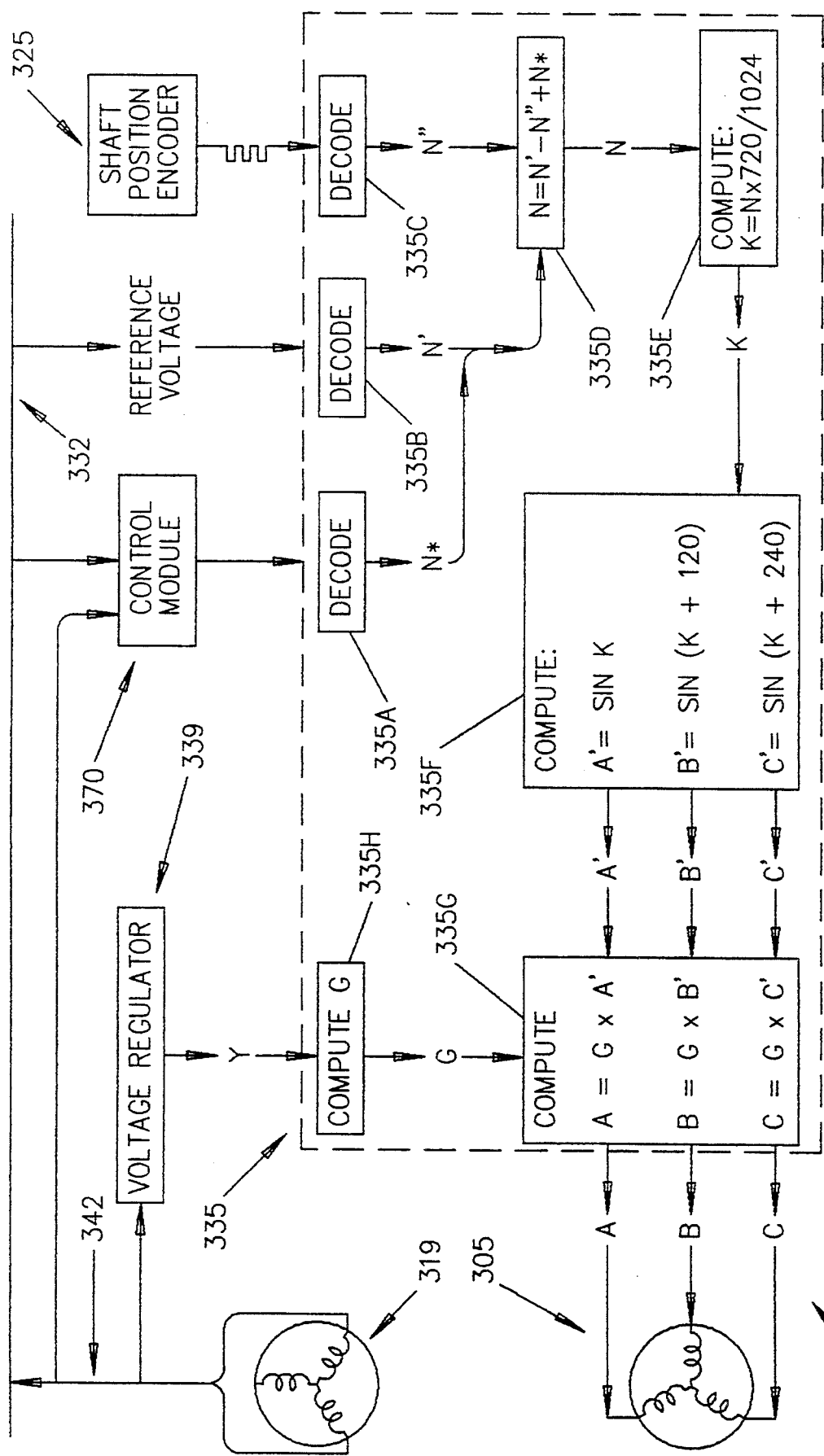
FIG. 11 is a flow diagram showing the flow of electronic logic and computation in the variable speed constant frequency generating system of FIG. 10.

Referring now to FIGS. 10 and 11, there is shown a variable speed constant frequency arrangement 330 which is constructed in accordance with the present invention. The variable speed constant frequency arrangement 330 includes a VSCF generator 310 that is substantially similar to VSCF generator 210 (FIG. 7) except that VSCF generator 310 has slip rings 307 for supplying the electrical excitation to polyphase electromagnetic field windings 305 of the VSCF generator 310 in place of the integral brushless exciter arrangement as shown in FIG. 7.

VSCF generator 310 includes a prior art optical shaft position encoder 325 which is electrically connected to a stationary, externally mounted, electronic flux vector controller 335. The prior art optical shaft position encoder 325 includes both a rotating reflecting disc first member 321, mounted on a generator power input shaft 302, and a stationary light source and sensors second member 323 mounted on a stationary generator housing 312. The prior art optical shaft position encoder 325 outputs digital information that describes the relative angular position between the rotating reflecting disc first member 321 and the stationary light source and sensors member 323.

The electronic flux vector controller 335 provides power to and receives electrical signals from the prior art optical shaft position encoder 325 and is electrically connected to a voltage regulator 339 to monitor the voltage of a generator power output 342. The electronic flux vector controller 335 is also electrically connected to a parallel source of electrical power 332. The electronic flux vector controller 335 receives its power from the parallel source of electrical power 332 and also monitors the AC frequency and voltage of the parallel source of electrical power 332.

For purposes of describing the operation of the variable speed constant frequency arrangement 330, the electronic flux vector controller 335 is shown at a stationary location outside of the VSCF generator 310, as opposed to the shaft mounted rotating electronic flux vector controller 297 in FIG. 7.

Considering now the operation of the variable speed constant frequency arrangement 230 (FIG. 7), the rotating reference first disc member 291 (FIG. 7), rotating at a reference speed, serves as a continuous angular position reference member indicating the required essentially continuous instantaneous angular position of the generator electromagnetic field relative to the generator stator armature windings 249 (FIG. 7) necessary to maintain an essentially constant AC frequency output from the VSCF generator 210 (FIG. 7). The shaft position encoder 295 (FIG. 7) effectively continuously measures the essentially instantaneous angular difference between the angular position of the generator rotor structure 233 (FIG. 7) and the reference angular position of the rotating disc first member 291 (FIG. 7). The electronic flux vector controller 297 (FIG. 7) performs simple computations to determine the per unit or relative values of electric current required for each phase of the polyphase electromagnetic field windings 235 (FIG. 7) so that the angular position of the electromagnetic field relative to the generator stator armature windings 249 (FIG. 7) is essentially continuously the same as the angular position of the reference first disc member 291 (FIG. 7) relative to the generator stator armature windings 249 (FIG. 7).

Considering again the variable speed constant frequency arrangement 330 shown in FIG. 10, the flux vector controller 335 internally generates digital data based on the analog sine wave voltage of the parallel source of electrical power 332. The flux vector controller 335 compares the digital data from the prior art shaft position encoder 325 with its own internally generated digital data. The flux vector controller 335 then computes the relative per unit value of electric current required to establish a generator main electromagnetic field to maintain a constant AC frequency generator power output 342 regardless of the rotational speed of the generator power input shaft 302 and the generator rotor structure 303.

This action by the flux vector controller 335 in the variable speed constant frequency arrangement 330 performs the same functions required for maintaining a constant AC frequency generated output as did the flux vector controller 297, the synchronous motor 279, the rotating housing 262, the rotating first disc member 291 and the bearings 263 and 265 of the variable speed constant frequency arrangement 230 shown in FIG. 7.

The computations performed by the electronic flux vector controller 335 are based on considering that one full cycle of sine wave AC voltage can be considered to represent 360 electrical degrees of rotation. In the case where the VSCF generator 310 is a 4-pole generator in a 60 HZ AC system, two complete cycles of the essentially sine wave voltage of the parallel source of electrical power 332 can be used as a reference 720 electrical degrees for 360 mechanical degrees of rotation.

The electronic flux vector controller 335 functionally at 335B divides two full cycles of the essentially sine wave voltage of the parallel source of electrical power 332 into 1024 equally spaced, in time, bits N' (FIG. 11). The 1024 time bits N' of the 720 electrical degrees of two full sine waves of AC voltage represent one full mechanical rotation or 360 mechanical degrees of a reference rotation rotating at a fixed reference speed of 1800 RPM for a 4-pole generator. Thus, it can be said that the flux vector controller 335 has electronically synthesized a reference rotation as opposed to the mechanical reference rotation established by the synchronous motor 277, the rotating housing 262 and the rotating disc first member 291 in VSCF generator 210 of FIG. 7.

The prior art shaft position encoder 325 divides one full 360 degree mechanical rotation of the rotating reflecting disc first member 321 into 1024 equally spaced, mechanically, bits N.''

The electronic flux vector controller 335 essentially continuously compares the mechanical angular position of the rotating reflecting disc first member 321, as represented by the bits count N'' with the electrical angular position, as represented by the bits count N' of the reference sine wave voltage of the parallel source of electrical power 332.

In other words, as shown in FIG. 10 and FIG. 11, the bits count N'' decoded functionally at 335C from the output signal of the prior art shaft position encoder 325 reports, 1024 times per mechanical revolution, the actual angular position of the rotating reflecting disc first member 321, the generator power input shaft 302, and the generator rotor structure 303 with respect to the stationary generator housing 312, a generator stator structure 317, and generator stator armature windings 319.

At the essentially same instant in time, the bits count N' derived by the flux vector controller 335 from the sine wave of the AC frequency of the parallel source of electrical power 332 defines the angular location where the electromagnetic field on the generator rotor structure 303 should be with respect to the generator stator armature windings 319.

Any difference, at any given instant in time, between the number of the time-based bits N' counted and the angular-location-based bits N'' counted represents the angular difference between where the generator rotor structure 303 is, and where the main electromagnetic field on the generator rotor structure 303 should be relative to the generator stator armature windings 319.

Considering the operation of the variable speed constant frequency arrangement 330 as opposed the variable speed constant frequency arrangement 230 (FIG. 7), the flux vector controller 335 (FIG. 10) compares the essentially instantaneous angular position of the generator rotor structure 303 with the angular position of a reference rotation electronically synthesized by the flux vector controller 335, as opposed to the flux vector controller 297 (FIG. 7) comparing the essentially instantaneous angular position of the generator rotor structure 233 (FIG. 7) with the angular position of a reference rotation mechanically generated by the action of the synchronous motor 277 (FIG. 7).

As shown in FIG. 11, the flux vector controller 335 essentially continuously computes at 335G the relative per unit values of electric current required for each of the windings in the polyphase electromagnetic field windings so as to maintain the electromagnetic field in the generator rotor structure 303, relative to the generator stator armature windings 319, essentially the same as the relative angular position of the reference rotation defined by the two full cycles of the essentially sine wave voltage of the parallel source of electrical power 332, relative to the same generator stator armature windings 319.

Consider now the condition where, at some instant in time, the reference rotation defined by the two full cycles of the essentially sine wave voltage of the parallel source of electrical power 332 has reached a count of N' equally spaced time bits. Consider also that the generator power input shaft 302 is rotating at some speed below the synchronous 1800 RPM synchronous speed, and that the shaft prior art position encoder 325 has generated an N" bit angular position count that is 12 bits less than the N' bit count. The flux vector controller 335 computes functionally at 335E and 335F that a fixed reference point on the generator rotor structure 303 is 12 mechanical bits, or 8.44 electrical degrees (4.22 mechanical degrees) behind the point in space where the electromagnetic field should be at that particular instant in time in order to continue to generate an essentially precise 60 HZ AC output. The flux vector controller 335 then computes the per unit value of electric current required for each circuit of the polyphase electromagnetic field windings 305 to establish an electromagnetic field with an angular location 8.44 electrical degrees (4.22 mechanical degrees) ahead of the fixed reference point on the generator rotor structure 303.

By essentially continuously monitoring the bit counts N' and N" and essentially continuously performing the internally programmed computations, the flux vector controller 335 essentially continuously up dates and maintains the correct angular relationship between the main generator electromagnetic field and the reference rotation defined by the two full cycles of the essentially sine wave voltage of the parallel source of electrical power 332 so that the VSCF generator 310 generates an AC output with essentially the same AC frequency as the parallel source of electrical power 332, essentially independent of the rotational speed of the generator power input shaft 302 and the generator rotor structure 303. By generating 1024 equally spaced, in time, bits representing two full cycles of the essentially sine wave voltage of the parallel source of electrical power 332, the flux vector controller 335 provides the same reference angular position, as a function of time, as is provided by the synchronous motor 279, the rotating housing 262, the rotating first disc member 291 and the bearings 263 and 265 of the variable speed constant frequency arrangement shown in FIG. 7.

A control module 370 monitors the phase difference between the voltages of the generator power output 342 and the voltage of the parallel source of electrical power 332 prior to the connection of the generator power output 342 to the AC mains of the parallel source of electrical power 332. After the generator power output 42 has been connected to the AC mains of the parallel source of electrical power 332, the control module 370 monitors the magnitude of the electrical power output from the VSCF generator 310 and compares the measured magnitude of actual generated power with a reference internally computed value of generator power capability based on the rotational speed of the generator power input shaft 302 as monitored by a tachometer (not shown).

Prior to the connection of the generator power output 342 to the parallel source of electrical power 332, the control module 370 generates a specific quantity of bits N, as a function of the phase difference between the voltage of the generator power output 342 and the voltage of the parallel source of electrical power 332. As shown in FIG. 11, the output from the control module 370 is functionally decoded at 335A to generate the quantity of bits N*. The bits N* is then added functionally at 335D to the reference time bits N' to advance the electromagnetic field in the generator rotor structure 303 relative to the electronically synthesized reference rotation defined by the sine wave voltage of the parallel source of electrical power 332, thus effectively varying the phase difference between the voltages of the generator power output 342 and the parallel source of electrical power 332. The control module 370 generates the bits N* as required to bring the output voltage of the generator power output 342 in phase with the voltage of the AC mains of the parallel source of electrical power 332.

In this respect, the control module 370 and the flux vector controller 335 effectively perform the same function as do the servo amplifier 255, the servo drive motor 285 and the servo drive mechanism 283 in FIG. 7.

Once the generator power output 342 has been connected to the AC mains of the parallel source of electrical power 332, the control module 370 generates bits N* as required to vary the power angle between the generator electromagnetic field on the generator rotor structure 303 and the rotating generator armature flux field established by the same parallel source of electrical power 332 that is used to establish the reference rotation bits N'. Again, In this respect, the control module 370 and the flux vector controller 335 effectively perform the same function as do the servo amplifier 255, the servo drive motor 285 and the servo drive mechanism 283 in FIG. 7.

In operation, referring now to FIG. 10 and FIG. 11, a prime mover 334 rotates the generator power input shaft 302, supported by bearings 357 and 353, at some speed between the minimum and maximum operating speeds of the system. The generator rotor structure 303, containing polyphase electromagnetic field windings 305, is mounted on and rotates with the generator power input shaft 302.

The flux vector controller 335 draws electrical power from the parallel source of electrical power 332 and continuously generates a bit count N' of 1024 bits, equally spaced in time, for every two full cycles of the essentially sine wave voltage of the parallel source of electrical power 332. Additionally, the flux vector controller 335 provides electrical power to the stationary light and sensors second member 323 of the prior art shaft position encoder 325 mounted on the stationary generator housing 312, and receives digital data from the light source and sensors second member 323 in the form of 1024 equally spaced bits N" for each full 360 mechanical degrees of rotation of the rotating reflecting disc first member 321 mounted on the generator power input shaft 302. The flux vector controller 335 computes the relative per unit values of electric current required for each of the electric windings of the polyphase electromagnetic field windings 305 and multiplies the per unit values by a gain factor G computed functionally at 335H. The gain factor G is derived from the voltage magnitude signal Y received from the voltage regulator 339 monitoring the voltage of the generator power output 342.

The flux vector controller 335 then provides a field excitation current 341 to slip rings 307 connected to the polyphase electromagnetic field windings 305 in the generator rotor structure 303 to maintain the voltage of the generator power output 342 at the same magnitude as the voltage of the parallel source of electrical power 332.

The control module 370 monitors the voltage of the generator power output 342 and the voltage of the separate, not connected, parallel source of electrical power 332. The control module 370 sends a bits count N, to the flux vector controller 335 required to effectively synchronize, or bring into correct phase relationship, the voltages of the generator power output 342 and the parallel source of electrical power 332.

Once the generator power output 342 has been connected to the AC mains of the parallel source of electrical power 332, the control module 370 monitors the magnitude of the generated power output of the VSCF generator 310 and compares it to an internally computed magnitude of power that should be generated by the VSCF generator 310 based on the wind speed and the rotational speed of the generator power input shaft 302 monitored by a tachometer (not shown). The control module 370 sends a bits count N* to the flux vector controller 335 to effectively control the power angle, and thus the power output, of the VSCF generator 310.

Figure 12:
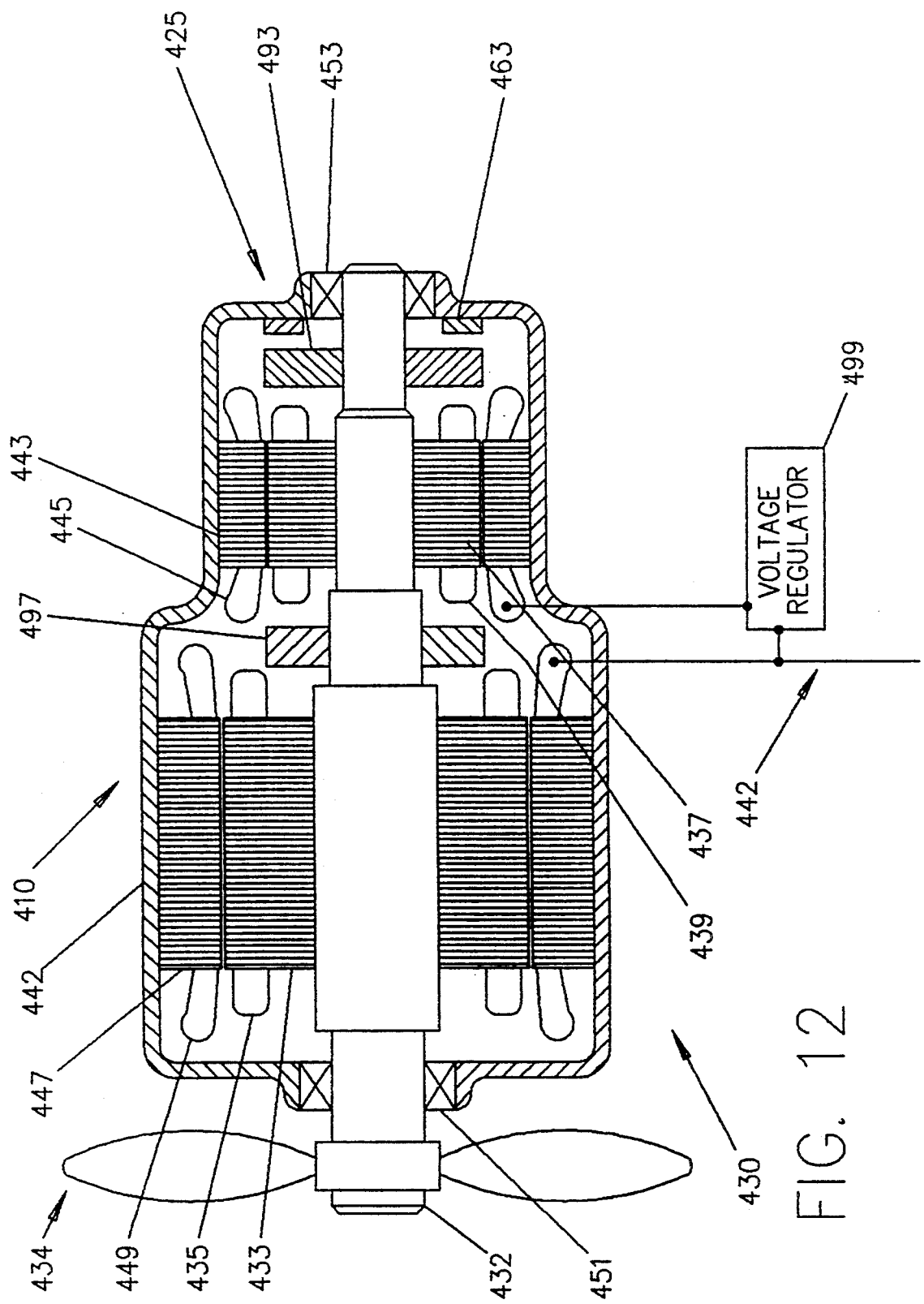
FIG. 12 is a diagrammatic sectional view of still another variable speed constant frequency generating system which is constructed in accordance with the present invention.
Figure 13:
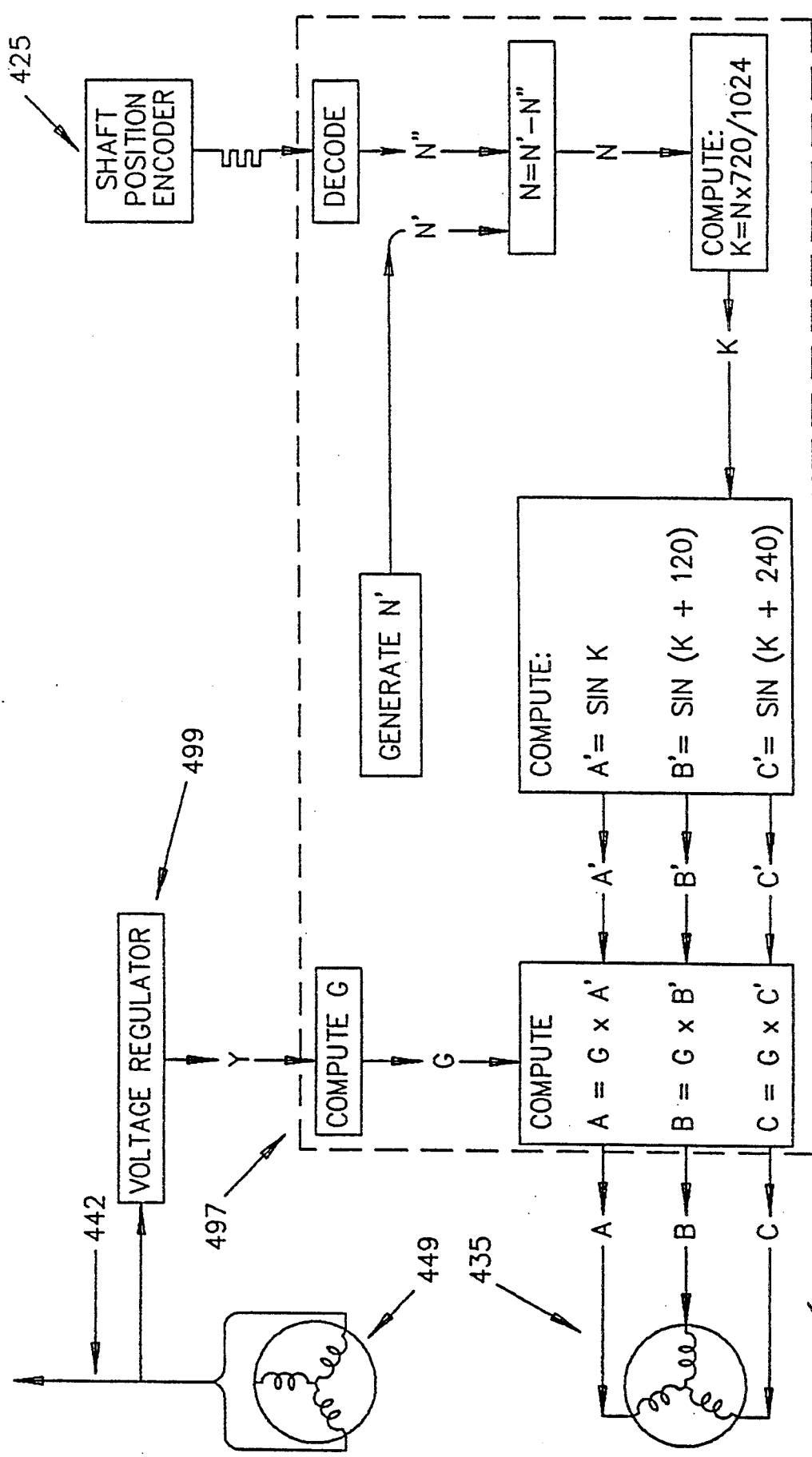
FIG. 13 is a flow diagram showing the flow of electronic logic and computation in the variable speed constant frequency generating system of FIG. 12.

Referring now to FIGS. 12 and 13, there is shown a variable speed constant frequency arrangement 430 which is constructed in accordance with the present invention. The arrangement 430 includes a stand-alone VSCF generator 410. The VSCF generator 410 is similar to the VSCF generator 210 (FIG. 7) except that the VSCF generator 410 is designed for applications where the VSCF generator 410 must operate independently of a parallel source of electrical power 231 (FIG. 7).

Considering now the VSCF generator 410 in greater detail, the VSCF generator 410 is similar to VSCF generator 210 (FIG. 7) except that it includes a prior art shaft position encoder 425 with a stationary reflective disc first member 463 attached to a stationary generator housing 442 as opposed to a modified shaft position encoder 295 (FIG. 7) with a rotating reflective disc first member 291 (FIG. 7) attached to a rotating housing 262 (FIG. 7) as in VSCF generator 210.

The VSCF generator 410 includes a rotating flux vector controller 497 mounted on a generator power input shaft 432 supported on bearings 451 and 453. The rotating flux vector controller 497 is electrically connected to a light source and sensors second member 493 of the prior art shaft position encoder 425. The electrical functional arrangement and operation of the flux vector controller 497 and the prior art shaft position encoder is much the same as that of the flux vector controller 335 (FIGS. 10 and 11) and the prior art shaft position encoder 325 (FIGS. 10 and 11).

For the case where the VSCF generator 410 is a 4-pole generator required to generate a fixed 60 HZ AC frequency, the internal electronic circuitry of the flux vector controller 497 generates equally spaced, in time, digital bits N' (FIG. 11). The internally generated equally spaced, in time, bits N' are generated at a rate of 1024 bits every 1/30 second of time. For a 4-pole VSCF generator generating 60 HZ AC, the equally spaced, in time, 1024 bits N' generated every 1/30 second of time by the internal circuitry of the flux vector controller 497 represent 720 electrical degrees or two full sine waves of AC voltage. The 1024 bits N' also represent one full mechanical rotation or 360 mechanical degrees of a reference rotation rotating at a fixed reference speed of 1800 RPM for a 4-pole generator. Thus the internal circuitry of the flux vector controller 497 electronically synthesizes a reference rotation.

The prior art shaft position encoder 425 divides one full 360 degree mechanical rotation of the rotating sensors second member 493 into 1024 equally spaced, mechanically, bits N".

The electronic flux vector controller essentially continuously compares the mechanical angular position of the sensors second member 493, as represented by the bits count N", with the electrical angular position of the electronically synthesized reference rotation, as represented by the reference bits count N' generated internally by the flux vector controller 497.

In other words, as shown in FIG. 12 and FIG. 13, the bits count N" from the prior art shaft position encoder 425 reports, 1024 times per mechanical revolution, the actual angular position of the sensors second member 493, the generator power input shaft 432, and the generator rotor structure 433 with respect to a stationary generator housing 442, a generator stator structure 447, and generator stator armature windings 449.

At the essentially same instant in time, the bits count N' of the electronically synthesized reference rotation generated by the flux vector controller 497 defines the angular location where the electromagnetic field established by rotating polyphase electromagnetic field windings 435 on a generator rotor structure 433 should be with respect to the generator stator armature windings 449.

Any difference, at any given instant in time, between the number of bits N' counted and the bits N" counted represents the angular difference between where the generator rotor structure 433 is, and where the main electromagnetic field on the generator rotor structure 433 should be relative to the generator stator armature windings 449.

As shown in FIG. 13, the flux vector controller essentially continuously computes the relative per unit values of electric current required for each of the windings in the polyphase electromagnetic field windings so as to maintain the electromagnetic field in the generator rotor structure 433, relative to the generator stator armature windings 449, essentially the same as the relative angular position of the reference rotation defined by the 1024 bits N' generated every 1/30 second in time by the internal circuitry of the flux vector controller 497.

Comparing FIG. 13 with FIG. 11, the bits N' are internally generated by the flux vector controller 497 as opposed to being derived from a reference voltage from a parallel source of electrical power 332 (FIG. 11) by the flux vector controller 335 (FIG. 11).

The rotating flux vector controller 497 receives all of its electrical power from brushless exciter windings 439 as opposed to the flux vector controller 335 (FIG. 10) receiving its electrical power from the parallel source of electrical power 332.

In operation of VSCF generator 430, a prime mover 434 rotates the power input shaft 432 at some speed between the minimum and maximum operating speeds of the system. A generator rotor structure 433, containing generator rotating polyphase electromagnetic field windings 435, is mounted on and rotates with the power input shaft 432. A brushless exciter armature structure 437 containing brushless exciter armature windings 439 is also mounted on and rotates with the power input shaft 432 which is supported on bearings 451 and 453. A generator housing 442 supports a stationary brushless exciter field structure 443 containing brushless exciter electromagnetic field windings 445. The generator housing 442 also supports a stationary generator stator structure 447 which contains generator stator armature windings 449.

The light source and sensors second member 493 of the optical shaft position encoder 425 is mounted on and rotates with the power input shaft 432. In this way, the light source and sensors second member 493 acts as a shaft member which rotates about the axis of the power input shaft 432 at the same speed at which the generator rotor structure 433 rotates about the axis of the power input shaft 432. The stationary reflective disc first member 463 of the optical shaft position encoder 425 is mounted in the generator housing 442

A voltage regulator 499 provides controlled variable electric current to the brushless exciter electromagnetic field windings 445 which sets up an electromagnetic field in the brushless exciter field structure 443. The interaction between the electromagnetic field in the brushless exciter field structure 443 and the rotating brushless exciter armature windings 439 generates a 3-phase AC power in the brushless exciter armature windings 439. This 3-phase AC power is fed into the rotating flux vector controller 497 mounted on the power input shaft 432.

The rotating flux vector controller 497 provides electrical power for the light source and sensors second member 493 of the optical shaft position encoder 425 and in turn receives digital information from the light source and sensors second member 493 of the optical shaft position encoder 425. The flux vector controller 497 decodes the digital information from the light source and sensors second member 493 of the optical shaft position encoder 425. This decoded digital information represents the angular position of the light source and sensors second member 493, the generator power input shaft 432, and the generator rotor structure 433 relative to a fixed point in space such as the reflective disc first member 463, the generator stator structure 447, and the generator stator armature windings 449.

The flux vector controller 497 generates, internally, digital information electronically synthesizing a reference rotation representing the angular position at which the main generator electromagnetic field should be at a given instant in time, relative to a fixed point in space such as the reflective disc first member 463, the generator stator structure 447, and the generator stator armature windings 449. The flux vector controller compares the two sets of digital information and computes the per unit value of the electric currents required to establish the main generator electromagnetic field at a position relative to the generator rotor structure 433 so that the main generator electromagnetic field is at the correct required angular position relative to the generator stator armature windings 449 at the given instant in time.

The voltage regulator 499 monitors the voltage of the generator power output 442 and varies the electric current supplied to the brushless exciter electromagnetic field windings 445 to maintain the voltage of the generator power output 442 at the proper level. The varying electric current supplied to the brushless exciter electromagnetic field windings 445 varies the magnitude of the voltage generated in the brushless exciter armature windings 445 which, in turn varies the actual magnitude of the per unit values of electric currents computed by the flux vector controller 497 for the rotating polyphase electromagnetic field windings 435 in the generator rotor structure 433.

It will be appreciated from the preceding that the present invention represents a significant advance to the field of electrical generating systems. In particular, the invention provides an electrical generating system wherein the frequency of the generated electrical output from a generator is independent of the rotational velocity of the power input shaft and the generator rotor. Additionally, the method and system of the present invention provide a technique to compare substantially instantaneously the rotational velocity of the power input shaft and the generator rotor with a reference speed, and to rotate instantaneously substantially the electromagnetic field with respect to the generator rotor. In this manner, a substantially constant and substantially unchanging rotational velocity of the generator electromagnetic field with respect to the generator stator armature windings, are maintained. As a result, a substantially constant and substantially unchanging output AC frequency is thereby maintained.

The method and system of the present invention also provides a technique to adjust momentarily the rotational velocity of the generator electromagnetic field relative to the generator stator armature windings in order to vary the phase relationship between the output voltage of the generator and some external voltage. Further, the inventive method and system can also adjust controllably the power angle between the generator electromagnetic field flux and the generator armature field flux, thereby to vary controllably the output power of the generator of the present invention.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

I claim:

1. An electrical power generating system comprising:
an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said stator armature windings;
rotatable reference means rotating at a variable reference speed;
means for controlling the rotational speed of said rotatable reference means at a variable rotational speed;
comparison means for substantially continuously comparing the angular position of said rotatable reference means with the angular position of said rotor;
control means for controlling said relative magnitude of said electric currents in each of said multiple circuits of said field coil windings whereby the angular position of said rotor electromagnetic field relative to said rotor is substantially the same as said angular position of said rotatable reference means relative to said rotor.

2. An electrical power generating system comprising:

an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said stator armature windings;

means for defining a reference angular position as a function of time;

means for controlling the angular position as a function of time of said reference angular position;

comparison means for substantially continuously comparing the angular position of said reference angular position with the angular position of said rotor;

control means for controlling said relative magnitude of said electric currents in each of said multiple circuits of said field coil windings whereby the angular position of said rotor electromagnetic field relative to said rotor is substantially continuously the same as the angular position of said reference angular position relative to said rotor.

3. An electrical power generating system comprising:

an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said Stator armature windings;

means defining a reference angular position as a function of the electrical angle as a function of time of an alternating current voltage;

means for controlling the angular position as a function of time of said reference angular position;

comparison means for substantially continuously comparing the angular position of said reference angular position with the angular position of said rotor;

control means for controlling said relative magnitude of said electric currents in each of said multiple circuits of said field coil windings whereby the angular position of said rotor electromagnetic field relative to said rotor is substantially continuously the same as the angular position of said reference angular position relative to said rotor.

4. An electrical power generating method using:

an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said stator armature windings;

rotatable reference means rotating at a fixed or controllably variable reference speed;

means for controlling the rotational speed of said rotatable reference means at a variable rotational speed;

comparison means for substantially continuously comparing the angular position of said rotatable reference means with the angular position of said rotor;

control means for controlling said relative magnitude of said electric currents in each of said multiple circuits of said field coil windings whereby the angular position of said rotor electromagnetic field relative to said rotor is substantially the same as said angular position of said rotatable reference means relative to said rotor.

5. An electrical power generating method using:

an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said stator armature windings;

means for defining a reference angular position as a function of time;

means for controlling the angular position as a function of time of said reference angular position;

comparison means for substantially continuously comparing the angular position of said reference angular position with the angular position of said rotor;

control means for controlling said relative magnitude of said electric currents in each of said multiple circuits of said field coil windings whereby the angular position of said rotor electromagnetic field relative to said rotor is substantially continuously the same as the angular position of said reference angular position relative to said rotor.

6. An electrical power generating method using:

an alternator having a rotor with field coils with a multiplicity of circuits for conducting multiple electric currents to thereby produce a multipolar electromagnetic field whose angular position relative to said rotor is determined by the relative magnitude of said electric currents in each of said multiple circuits, a stator armature having windings that generate alternating current voltages in response to said multipolar electromagnetic field when said multipolar electromagnetic field is rotated in respect to said stator armature windings, and output terminals connected to said stator armature windings;

means defining a reference angular position as a function of the electrical angle as a function of time of an alternating current voltage;

means for controlling the angular position as a function of time of said reference angular position;

comparison means for substantially continuously comparing the angular position of said reference angular position with the angular position of said rotor;

control means for controlling said relative magnitude of said electric currents in each of said multiple circuits of said field coil windings whereby the angular position of said rotor electromagnetic field relative to said rotor is substantially continuously the same as the angular position of said reference angular position relative to said rotor.

7. A system according to claim 1, wherein said reference means includes rotating variable coupling transformer means.

8. A system according to claim 1, wherein said reference means includes synchro resolver means.

9. A system according to claim 1, wherein said reference means includes shaft position encoder means.

10. A system according to claim 1, wherein said means for controlling the rotational speed includes a servo motor drive system.

11. A system according to claim 1, wherein said control means includes rotating variable coupling transformer means.

12. A system according to claim 1, wherein said control means includes power amplifying means.

13. A system according to claim 1, wherein said control means includes flux vector control means.

14. A system according to claim 2, wherein said reference means includes rotating variable coupling transformer means.

15. A system according to claim 2, wherein said reference means includes synchro resolver means.

16. A system according to claim 2, wherein said reference means includes shaft position encoder means.

17. A system according to claim 1, wherein said means for controlling the rotational speed includes a servo motor drive system.

18. A system according to claim 2, wherein said control means includes rotating variable coupling transformer means.

19. A system according to claim 2, wherein said control means includes power amplifying means.

20. A system according to claim 3, wherein said control means includes flux vector control means.

21. A system according to claim 3, wherein said reference means includes rotating variable coupling transformer means.

22. A system according to claim 3, wherein said reference means includes synchro resolver means.

23. A system according to claim 3, wherein said reference means includes shaft position encoder means.

24. A system according to claim 3, wherein said control means includes rotating variable coupling transformer means.

25. A system according to claim 3, wherein said control means includes power amplifying means.

26. A system according to claim 3, wherein said control means includes flux vector control means.

* * * * *